United States Patent

[11] 3,593,862

[72] Inventors Edward D. Pierson
  Denver;
  James C. Wright, Arapahoe, both of, Colo.
[21] Appl. No. 740,553
[22] Filed June 27, 1968
[45] Patented July 20, 1971
[73] Assignee Cutler-Hammer, Inc.
  Milwaukee, Wis.

[54] INTERFINGERING ENDLESS ELEVATOR AND CONVEYOR APPARATUS
  19 Claims, 17 Drawing Figs.
[52] U.S. Cl. .................................................. 214/11 R,
  198/157, 198/40, 198/323, 198/33, 214/16.4
[51] Int. Cl. ..................................................... B65g 43/00
[50] Field of Search ........................................... 198/156,
  157, 24; 214/16 B, 16.4, 16.1, 16.1 A, 16.1 B

[56] References Cited
UNITED STATES PATENTS

| | | | | |
|---|---|---|---|---|
| 1,020,746 | 3/1912 | Dehler | | 198/157 X |
| 1,302,631 | 5/1919 | Buck | | 198/156 |
| 1,736,472 | 11/1929 | Wego | | 198/156 |
| 2,089,047 | 8/1937 | Zrna | | 214/16.1 (2-B) |
| 2,216,685 | 10/1940 | Caesar | | 198/156 X |
| 2,310,461 | 2/1943 | Regan et al. | | 214/11 |
| 2,619,239 | 11/1952 | Hild et al. | | 214/16.1 (2-B) |
| 2,936,908 | 5/1960 | Carothers | | 214/16.4 X |
| 3,184,032 | 5/1965 | Jonsson | | 198/156 X |

FOREIGN PATENTS

| | | | |
|---|---|---|---|
| 867,376 | 7/1949 | Germany | 198/156 |
| 942,498 | 5/1956 | Germany | 198/156 |
| 1,028,103 | 5/1966 | Great Britain | 198/156 |

Primary Examiner—Gerald M. Forlenza
Assistant Examiner—Raymond B. Johnson
Attorney—Anderson, Spangler and Wymore ABSTRACT: This invention relates to an automatic bundle-elevating apparatus of a type especially adapted to raise newspaper bundles transversely a conveyor at one level and discharge same on a conveyor at another level. The unit includes a specially designed roller conveyor section equipped with a retractable bundle stop that can be inserted into a standard roller conveyor and used to divert bundles to the elevator. Mounted alongside the roller conveyor section immediately ahead of the retractable stop is a pneumatic pusher that cooperates with said stop to square up the bundle preparatory to lifting same free of the conveyor surface. The elevating mechanism comprises a plurality of horizontal, transversely spaced pairs of double-tined arms that move up between the rollers of the conveyor on a sprocket chain and lift the bundle free thereof. As the bundle moves up the elevator, it either passes through or strikes a bail pivotally mounted on the elevator column and extending out over the conveyor section. If the bundle is misaligned to the degree where it strikes the bail, the latter will actuate to shut down the elevator until the condition is remedied. At least one, and usually several, locations on the elevator column, a discharge station is provided that is equipped with a pneumatic pusher operative upon actuation to push the bundle off of the arms supporting same and onto a second elevated roller conveyor running past the unit. A safety-gate at the upper extremity of the elevator column will actuate to shut down the unit if a misaligned bundle strikes same or personnel attempt to ride up the elevator.

PATENTED JUL 20 1971

INVENTORS
EDWARD D. PIERSON
JAMES C. WRIGHT
BY

ATTORNEYS

INVENTORS
EDWARD D. PIERSON
JAMES C. WRIGHT
BY
Anderson, Spangler & Wymore
ATTORNEYS

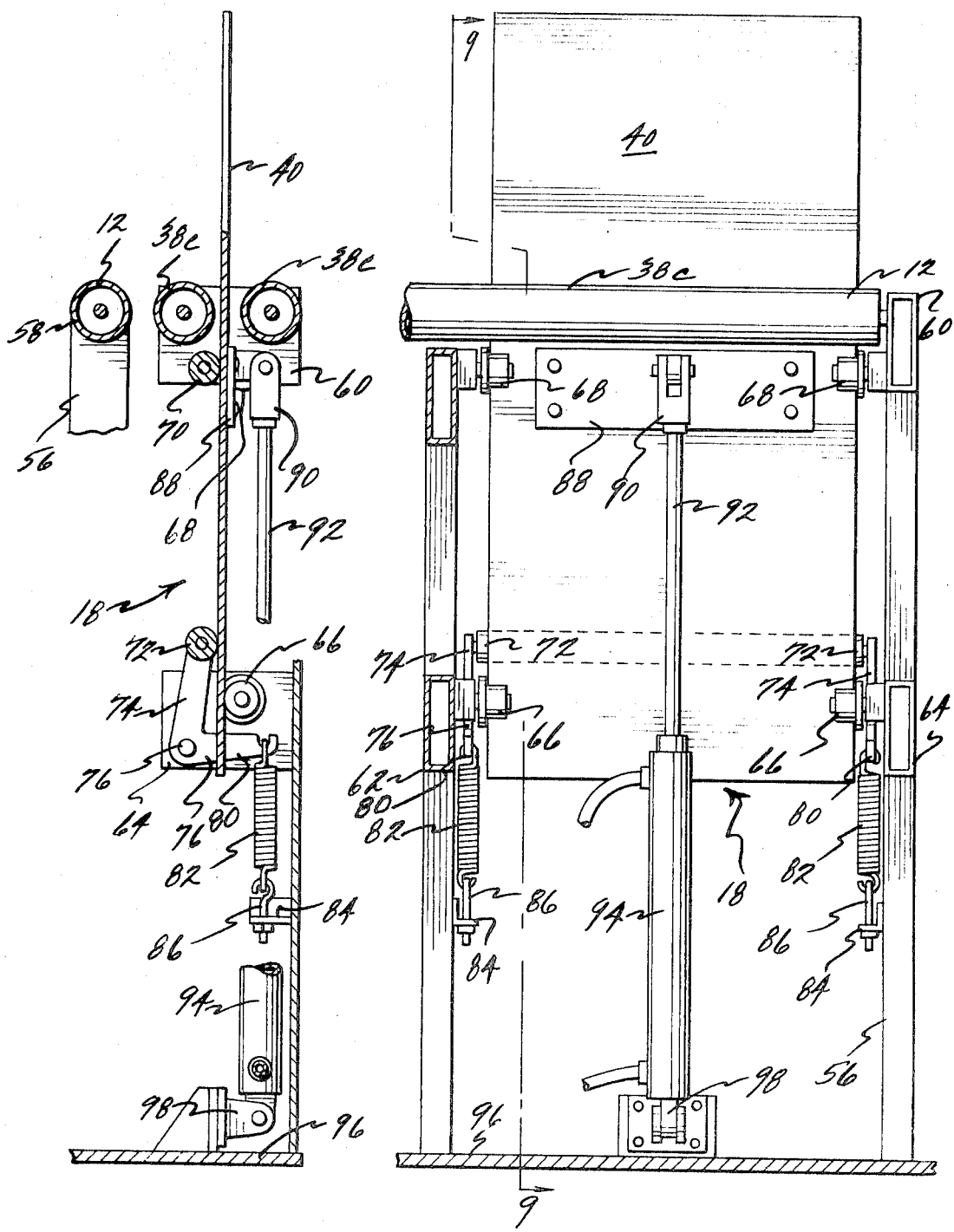

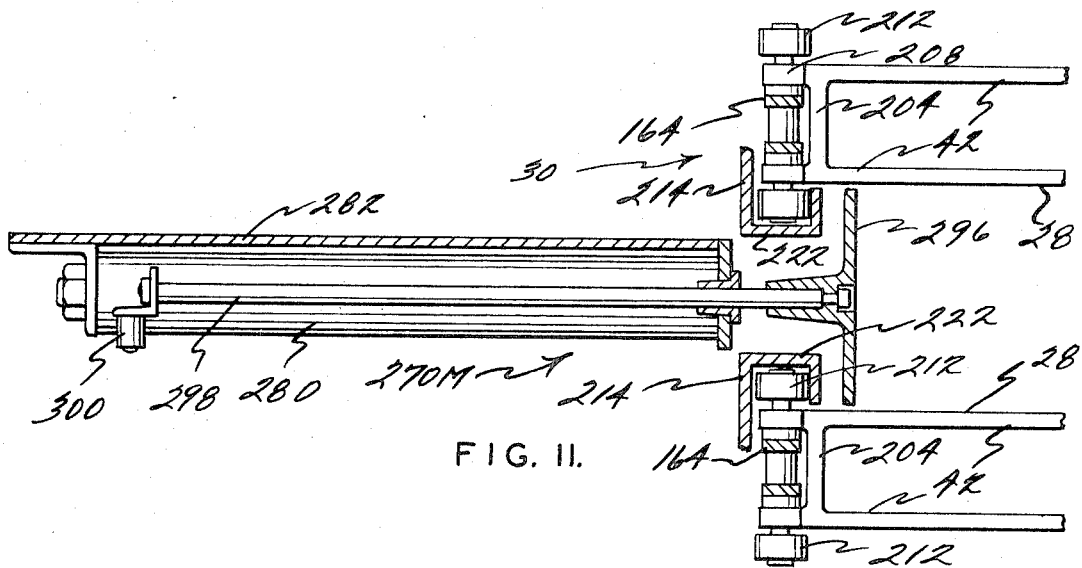
FIG. 11.
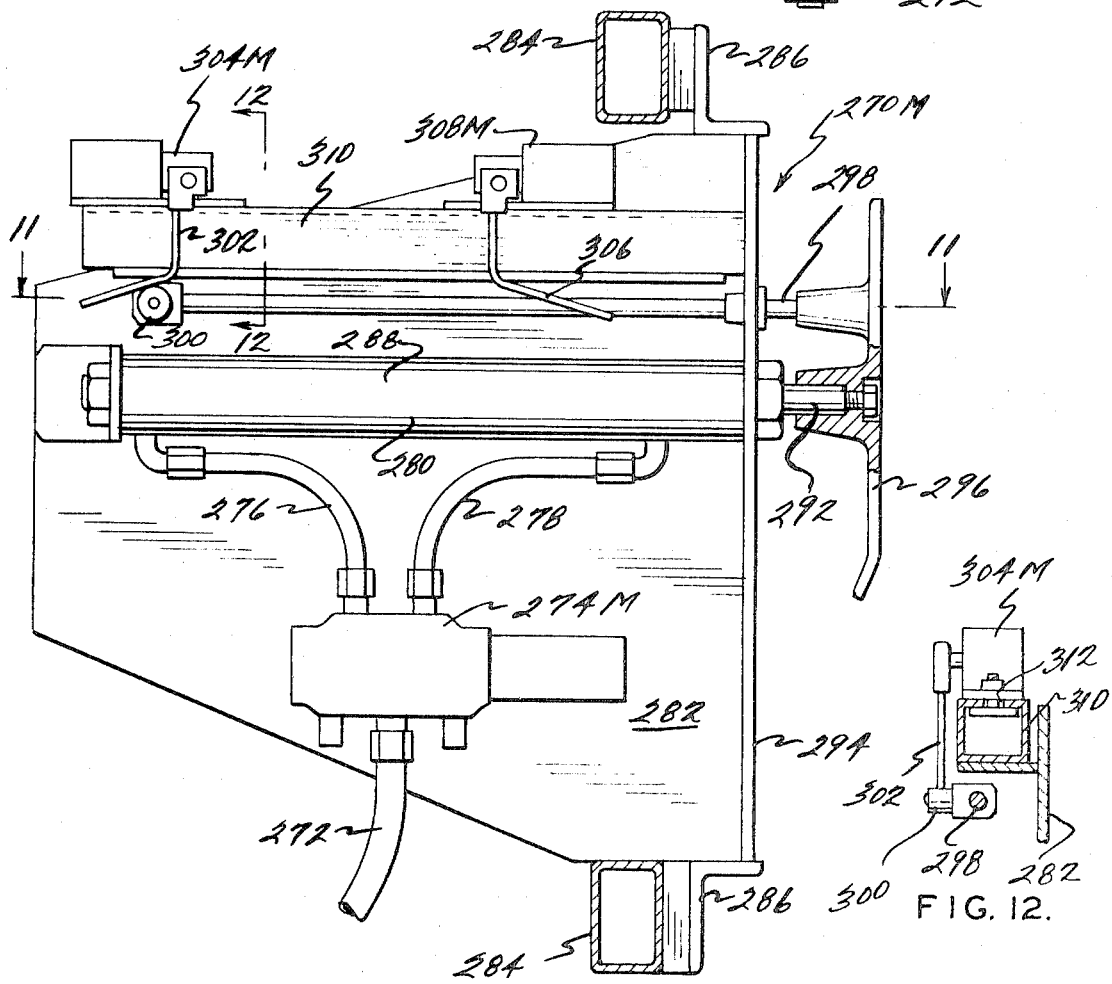
FIG. 10.
FIG. 12.
INVENTORS
EDWARD D. PIERSON
JAMES C. WRIGHT
BY
ATTORNEYS

INTERFINGERING ENDLESS ELEVATOR AND CONVEYOR APPARATUS

The shipping or mailing room of a large metropolitan newspaper consists of a complex network of intersecting conveyors interconnecting the stackers and bundle tiers with the loading docks. It becomes extremely difficult to move personnel and equipment around the floor area without interrupting the conveying operations. It is a well known fact among material handling experts that the floor area is "premium-space" and, whenever possible, should be left relatively open and unobstructed so that it can be utilized to best advantage. Obviously, if the movement of material could be carried out at one or more levels, say 10 or more feet above ground level, then the floor space would be left open for other high-priority needs and the overhead space that is usually wasted would be utilized quite effectively. It is in just such a material handling system as this that the instant elevator finds its maximum utility.

Previously tied bundles discharged from a bundle tier can be picked up by the elevator and discharged to any one of several stacked overhead conveyors for movement across the mailing room before being dropped down again to the loading dock or the like, usually by means of a gravity chute rather than an elevator. The elevator's roller conveyor section will carry the bundle on past its elevating column, if desired.

It is, therefore, the principal object of the present invention to provide a novel and improved elevator for tied newspaper bundles and the like.

A second objective is to provide a unit of the type aforementioned which includes means capable of automatically stopping and squaring an incoming bundle preparatory to lifting same.

Another object is to provide a bundle-elevating apparatus having a bundle-encircling bail operative to shut down the unit whenever a misaligned bundle moves thereagainst.

Still another objective is the provision of an elevating mechanism having two or more pneumatic bundle pushers independently and automatically operative to push a bundle riding up the elevator off into a conveyor running alongside thereof.

An additional objective of the invention herein disclosed and claimed is to provide an elevating mechanism that is equipped with interchangeable pneumatic pusher subassemblies that can be exchanged almost instantly for repair purposes, and added or removed from the unit to vary the number and location of the discharge stations in accordance with a particular need.

A further object is to provide a bundle elevator that is relatively simple, easy to operate, rugged yet gentle, versatile, compact, safe, fast, easily repaired and even somewhat decorative.

Other objects will be in part apparent and in part pointed out specifically hereinafter in connection with the description of the drawings that follows, and in which:

FIG. 8 is a fragmentary section looking to the left in FIG. 3 at the back of the retractable stop;

FIG. 9 is a fragmentary section taken along line 9-9 of FIG. 8;

FIG. 10 is a side elevation to an enlarged scale showing one of the interchangeable pneumatic pusher subassemblies housed within the elevator column, portions of the latter and the pusher plate having been shown in section;

FIG. 11 is a section taken along line 11-11 of FIG. 10;

FIG. 12 is a fragmentary section taken along line 12-12 of FIG. 10;

Figure 1:
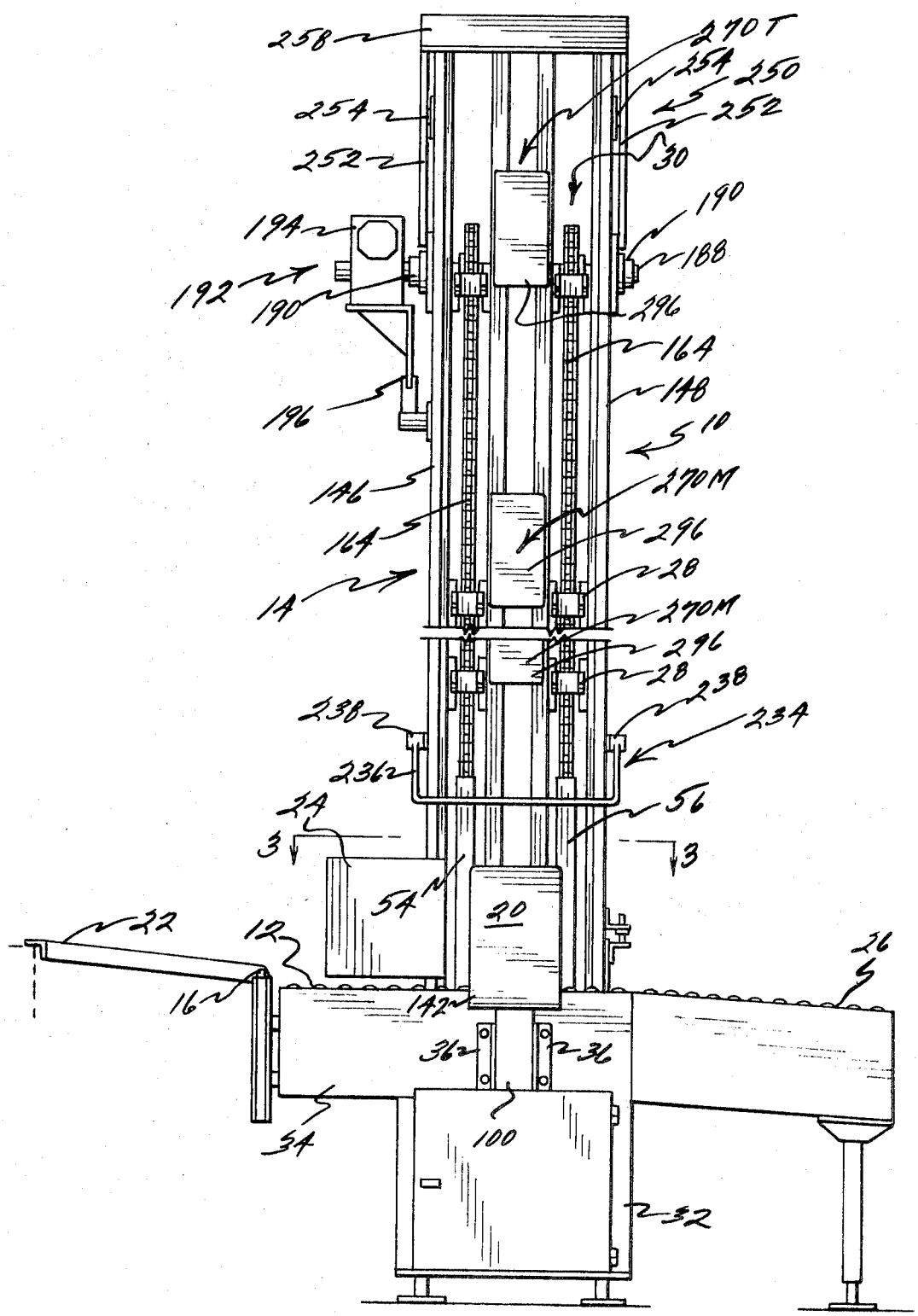
FIG. 1 is a front elevation of the bundle elevator, portions of the elevator column having been broken away to conserve space.
Figure 2:
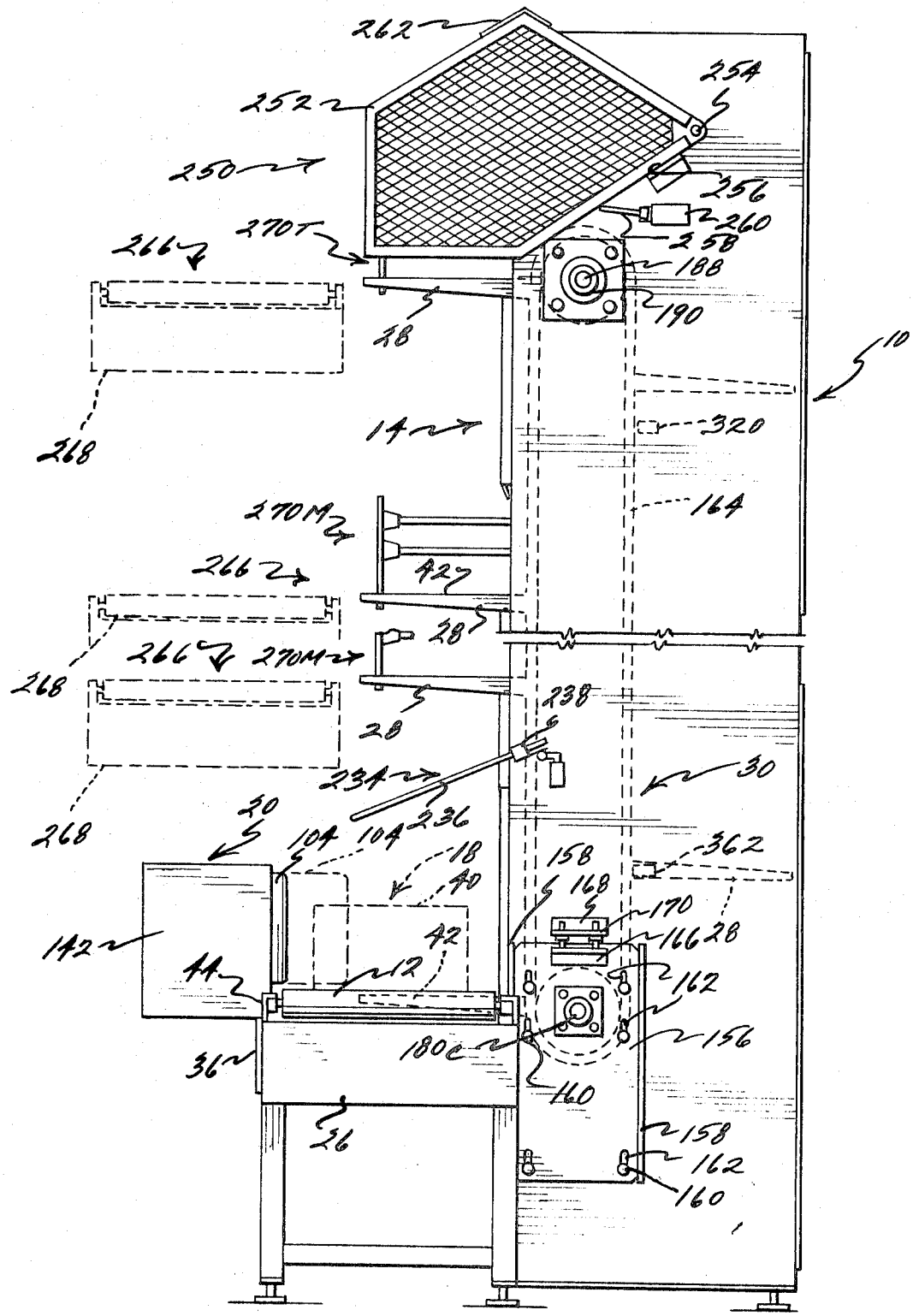
FIG. 2 is a right side elevation wherein portions have, once again, been broken away from the column to conserve space, and discharge conveyors have been shown in broken lines alongside the several transfer stations.
Figure 3:
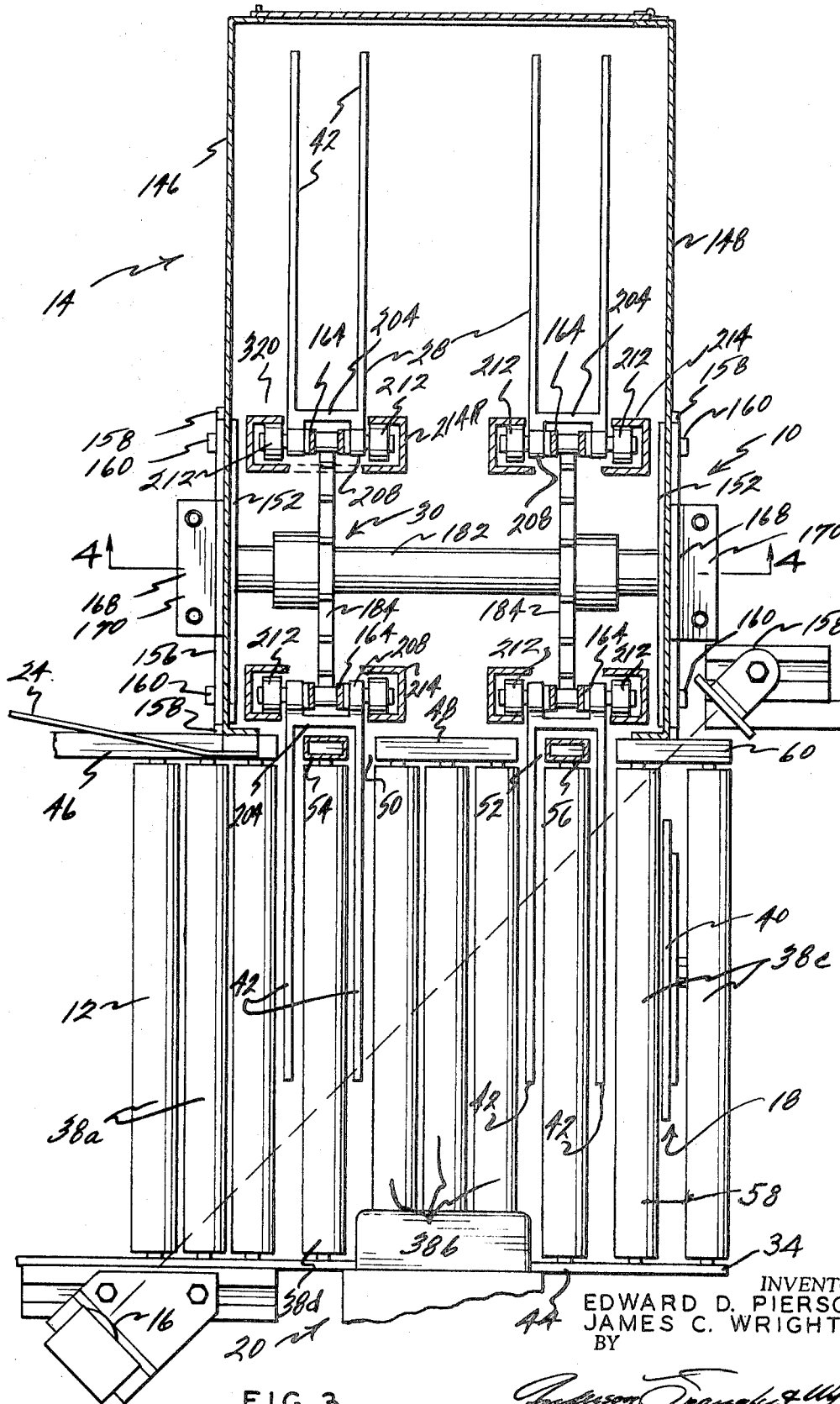
FIG. 3 is a horizontal section taken along line 3-3 of FIG. 1 to an enlarged scale, portions of the bundle pusher having been broken away to conserve space.

Referring now to the drawings for a detailed description of the present invention and, initially, to FIGS. 1, 2 and 3 for this purpose, reference numeral 10 has been selected to designate the elevator in its entirety, which will be seen to include a roller conveyor section 12 disposed in front of a hollow elevator shaft or column that has been indicated in a general way by reference numeral 14. The conveyor section 12 has a bundle-sensing mechanism 16 mounted thereon that is responsive to the presence of an incoming bundle and operative to actuate a retractable bundle-stop subassembly that has been indicated in a general way by reference numeral 18 and a bundle-pusher subassembly similarly indicated by reference numeral 20.

In the particular form of the invention shown in FIG. 1, a gravity-chute 22 is used to deliver a previously tied bundle onto the surface of roller conveyor 12. A deflector plate 24 guides the bundle into position in front of elevator column 14 where it interrupts the beam (broken lines in FIG. 3) of the electric eye bundle sensor 16 that projects said beam diagonally thereacross.

As shown, chute 22 is hingedly attached to the intake end of the conveyor 12 so as to form a gate; however, instead of this chute, a continuation of the roller conveyor may be provided or the conveyor might well be connected to receive bundles directly from a bundle tier (not shown) located immediately adjacent thereto. Much the same thing is true of the discharge end of roller conveyor section 12. As illustrated, the discharge end of roller conveyor section 12 is shown connected to a short gravity-fed roller conveyor unloading station 26 such as might be found in a dock area or the like although, obviously, it is immaterial what type of material handling apparatus the elevator discharges into. In fact, under most conditions, the bundles will rarely reach the discharge of conveyor section 12 as the elevator will be activated to bypass the latter.

Conveyor section 12 is specially designed to accommodate the retractable bundle-stop subassembly 18 and the movement of the chain-driven lifting arms 28 that form a part of the chain-lift subassembly which has been broadly referred to by reference numeral 30 and to which specific reference will be made presently. The conveyor in the form illustrated has a ground-supported base 32 having a front panel 34 carrying angle iron brackets 36 that mount the pusher subassembly 20 alongside the roller surface. The base 32, of course, includes various uprights, sidepanels, legs, cross frame members and the like, but no useful purpose would be served by describing same in detail with the exception of those few that are significant to the design and operation of the unit. The main changes in the roller conveyor section 12 are the spacing of the rollers 38 to accommodate the movement therebetween of retractable stop 40 and the tines 42 of arms 28, and the mounting of said rollers so as to allow these tines to pass up through the conveyor surface.

As seen in FIG. 3, the first set of three rollers 38a at the intake end of the roller conveyor are journaled for rotation in closely spaced parallel relation to one another between front and rear horizontal frame elements 44 and 46. Another similar set of three rollers 38b is located in centered relation relative to column 14 so as to leave a gap of substantial width between it and the first set of three rollers 38a and a set of two rollers 38c at the discharge end which will be described presently. This middle set of three rollers 38b is journaled at the front of the unit within frame element 44 and at the rear in short horizontal frame section 48 which, except for the gaps 50 and 52 on opposite sides thereof, would be a continuation of element 46.

An upright 54 extends up into gap 50 left between triple roller sets 38a and 38b and journals the rear end of single roller 38d as shown. Even with roller 38d in place, gap 50 is sufficiently wide to allow the tines 42 of arms 28 to pass on opposite sides thereof and between the latter roller and the triple roller sets 38a and 38b adjacent thereto. Another upright 56 extends up into gap 52 left between roller sets 38b and 38c where it journals single roller 58 in spaced relation therebetween such that the tines 42 of arms 28 can pass alongside thereof. Thus, provision is made for moving the lifting arms 28 up through the rollers 38 of conveyor surface 12 so as to lift a bundle free thereof.

Rollers 38c comprise a two, rather than a three, roller set with the two rollers being spaced apart to accommodate the plate 40 of retractable stop subassembly 18 therebetween. The front ends of rollers 38c are journaled within frame member 34 as are all of the other rollers of conveyor section 12; whereas, the short horizontal frame element 60 journals the rear ends thereof.

The retractable plate subassembly 18 can best be seen in FIGS. 8 and 9 to which specific reference will now be made. The frame includes a pair of front and rear horizontal frame members 62 and 64 spaced well beneath the roller conveyor surface that carry a couple of flanged trunnions 66 for rotation in transverse alignment with one another. An identical set of flanged trunnions 68 are journaled for rotation in transversely aligned relation above the first-mentioned set so as to provide a track for plate 40 to ride up and down vertically. The cylindrical portions of the trunnions roll along the backside of plate 40 while the flanges run along the side margins thereof.

A roller 70 (FIG. 9) is journaled for rotation transversely of the conveyor frame in position to bear against the front of plate 40 and hold same against the upper transversely spaced pair of trunnions 68. Spaced beneath roller 70 in parallel relation thereto is a second roller 72 journaled between the free ends of the upstanding arms 74 of dogleg cranks 76. Cranks 76 are spaced apart a distance greater than the width of plate 40 and fastened to the frame for pivotal movement about a substantially horizontal axis intermediate the ends thereof defined by pivot pins 78. The horizontal legs 80 of these cranks pass alongside plate 40 over onto the backside thereof where they connect onto tension springs 82 fastened to brackets 84 by means of hooks 86. Springs 82 thus act through the dogleg cranks to bias roller 72 against the front face of plate 40 so as to keep same constantly in contact with flanged trunnions 66.

A bracket 88 fastened to the rear face of plate 40 is pivotally received in clevis 90 on the upper end of piston rod 92. Rod 92 is mounted for reciprocating movement inside pneumatic servomotor 94 that is attached to the base 96 of the frame by a similar bracket and clevis pivotal connection 98. This servomotor is controlled by a conventional valve (not shown) which, upon being shifted into its active position becomes operative to raise plate 40 up through the roller conveyor surface 12 into the position it is shown occupying in FIGS. 8 and 9 preparatory to being struck by an incoming bundle. This same valve, upon being shifted to its inactive position, reverses the flow of air to the servomotor and retracts plate 40 to a position beneath the roller conveyor surface such as that shown in FIG. 1. With plate 40 retracted, the bundle is, of course, free to move right on past the elevator. Ordinarily, the plate will be raised into its operative position so that the bundle elevator forming the subject matter hereof will, likewise, be operative.

Now, a bundle moving along the roller conveyor 12 and striking the retractable bundle-stop subassembly 18, more likely than not, will be skewed or otherwise misaligned so that it will not ride up the elevator properly. Accordingly, a pneumatic bundle-pusher subassembly 20 is disposed alongside the conveyor for movement laterally thereacross ahead of the stop 18. The function of this pusher is, of course, to cooperate with the stop to square up the bundle preparatory to lifting same and also to move it up snugly against the elevator in position to be lifted by the fingers 28. Pusher subassembly 20 has been revealed most clearly in FIGS. 1, 2, 6 and 7 to which specific reference will now be made.

A vertically disposed channel-shaped mounting post 100 is fastened to the side of the roller conveyor frame between brackets 36 and opposite the elevator shaft 14. Fastened to one flange of post 100 is a mounting plate 102 that carries the several elements of the pusher subassembly that controls the movements of pusher element 104. The first of these is a pneumatic servomotor 106 which mounts behind post 100 with its piston rod 108 projecting onto the front thereof for movement out over conveyor 12. The rear end of the servomotor cylinder is secured to a bracket 110 fastened to plate 102.

A pair of air lines 112 and 114 are connected into opposite ends of the servomotor 106 from a solenoid-controlled air valve 116. With valve 116 deenergized, the piston rod is retracted so that line 112 is functioning as an air feed line and line 114 as an exhaust line. Upon energization of valve 116, on the other hand, the functions of these air lines reverses and the piston rod 108 moves into its extended operative position carrying with it pusher element 104 fastened to the front end thereof.

Figure 6:
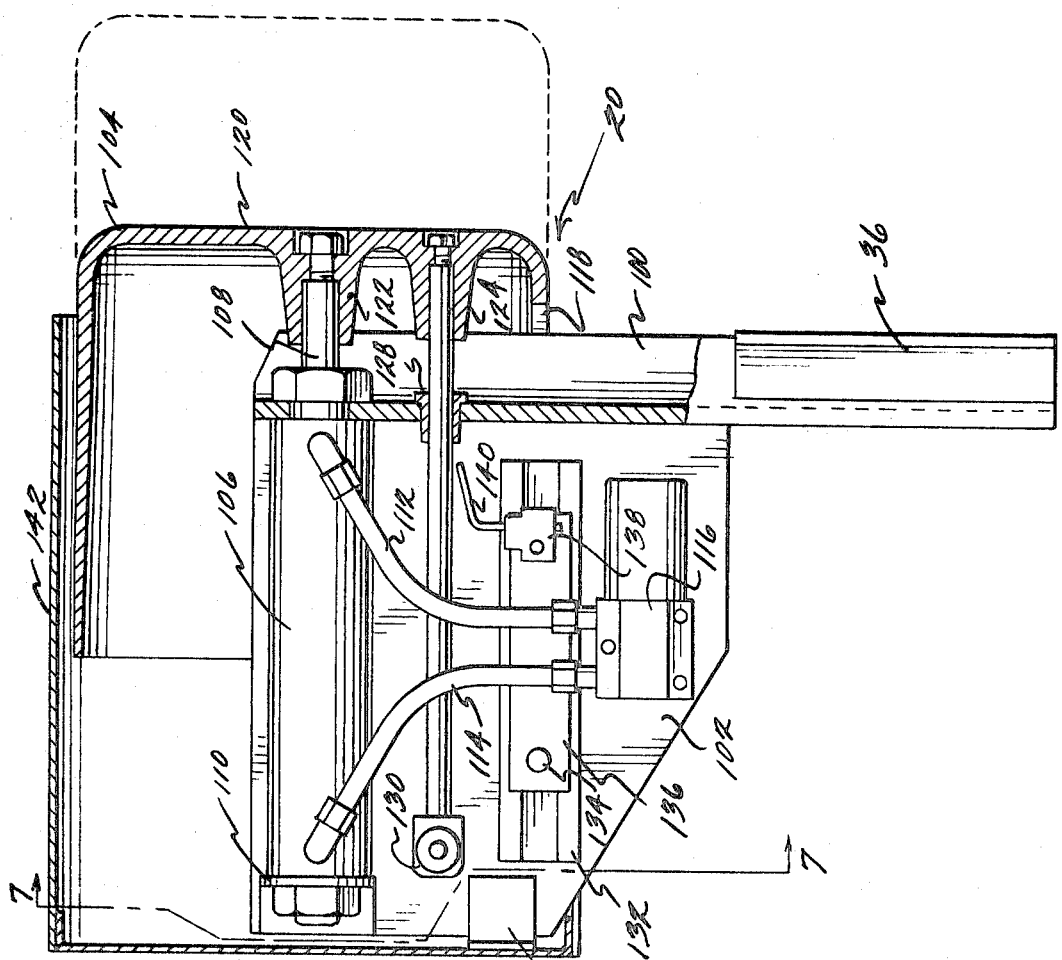
FIG. 6 is an elevation to an enlarged scale of the bundle pusher that squares up the incoming bundle, considerable portions thereof having been broken away and shown in section to more clearly reveal the interior construction.
Figure 7:
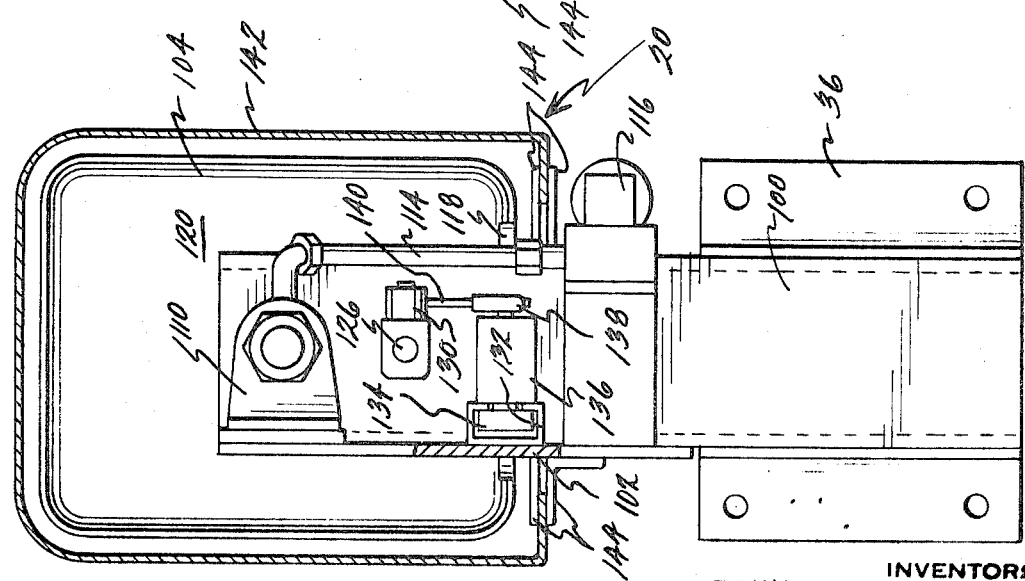
FIG. 7 is a section taken along line 7-7 of FIG. 6.

The latter element, in the particular form shown, has the shape of a hollow box laid on its side with rounded corners and a slot 118 in the bottom wall adapted to receive post 100. The front wall 120 has an integrally formed boss 122 on the inside thereof that receives the piston rod 108 as shown in FIG. 6. A similar boss 124 receives a rod 126 that parallels the piston rod 108 and reciprocates within a sleeve 128 mounted in the web of post 100. The prime function of rod 126 is, of course, to guide pusher element 104 and prevent same from rotating about piston rod 108 as an axis. An incidental, but nonetheless important, additional function performed by rod 126 is to carry switch actuator 130 on the rear end thereof. This switch actuator 130 is shown in the form of a roller that reciprocates back and forth with rods 108 and 126 and, of course, pusher element 104 attached thereto.

Mounted on plate 102 beneath rod 126 is a track 132 having a generally C-shaped cross section that accepts trunnions 134 (one of which is shown) mounted on slideblock 136 for longitudinal adjustment. On the side of slideblock 136 opposite the trunnions 134 is mounted a switch 138 having its actuating lever 140 located in the path of switch-actuating roller 130. Switch 138 functions upon actuation to reverse servomotor 106 by deenergizing solenoid valve 116 so as to return pusher element 104 to its normal retracted position. By sliding slideblock 136 to and fro within track 132, the forward excursion of the pusher element 104 is adjusted to that required to push a bundle up snug against the elevator shaft 14.

Pusher element 104 retracts into an open-fronted housing 142 which is essentially boxlike. It is attached to post 100 and plate 102 by suitable mounting brackets 144 that enable it to be removed for servicing the servomotor, adjusting slideblock 136 and performing other maintenance functions. Housing 142 has, as its prime function, that of a safety shield to protect the personnel from injury as the pusher reciprocates under the impetus of servomotor 106. The excursion of the pusher is approximately that indicated by broken and full lines in FIGS. 2 and 6. Once the pusher has finished its operating cycle, it will have pushed the bundle up tight against the elevator shaft as represented by upright frame elements 54 and 56. The bundle should be squared up, compacted transversely and otherwise readied for lifting.

FIGS. 1 through 5, to which reference will now be made, most clearly reveal the chain-lift subassembly 30 inside elevator shaft 14. The latter shaft includes a pair of side panels 146 and 148 arranged in transversely spaced relation that have large inverted keyway-shaped openings 150 therein near the bottom. These sidepanels are reinforced in the area of the openings 150 by heavy plates 152 that are fastened to the inside thereof and contain similar openings 154 in registry with said openings 150. Fastened over openings 150 on the outside of the side panels are bearing support plates 156 that can move up and down vertically between a pair of spaced parallel guiderails 158 shown most clearly in FIGS. 2 and 3. As seen in FIG. 2, the bearing plate mounting studs 160 pass through vertically disposed slots 162 that enable said plates to slide up and down within their tracks 158, thus forming a means for tightening chains 164. A pair of short angle iron sections 166 and 168 are fastened, respectively, to the bearing plate 156 and sidepanels 146 and 148 with their horizontal flanges 170 in spaced parallel relation one above the other. A pair of studs 172 with their heads 174 resting atop flange 170 of angle iron section 166 and a nut 176 threaded thereon up against the underside of the corresponding flange of section 168, provide the means for urging the bearing plates down so as to tighten the chains 164 and keep the slack out of them.

Opposite the narrow section of the registering inverted keyway-shaped openings 150 and 154 are a pair of aligned openings 178 in the bearing support plates 156 that receive shaft bearings 180. These bearings journal a shaft 182 upon which is mounted a pair of sprocket gears 184 that are arranged in transversely spaced parallel relation to one another.

Next, with reference to FIGS. 1 and 2, it will be seen that a second set of sprocket gears 186 are mounted on a shaft 188 journaled for rotation in bearings 190 located at the top of the elevator shaft 14. Shaft 188 projects out through the side of the elevator shaft where it is operatively connected to a suitable drive mechanism indicated in a general way by numeral 192 and which includes a speed reducer 194, a motor (not shown), and the necessary mountings 196 for the latter.

The upper and lower pairs or sets of sprocket gears 184 and 186 are vertically aligned and operatively interconnected in driving relation by endless sprocket chains 164. It is worth noting at this point that the above-described chain-lift 30 is displaced toward the open front of the elevator shaft 14 so as to leave room for the pickup arms 28 to return to the bottom down the back thereof as indicated quite clearly by broken lines in FIGS. 2 and 3.

Figure 13:
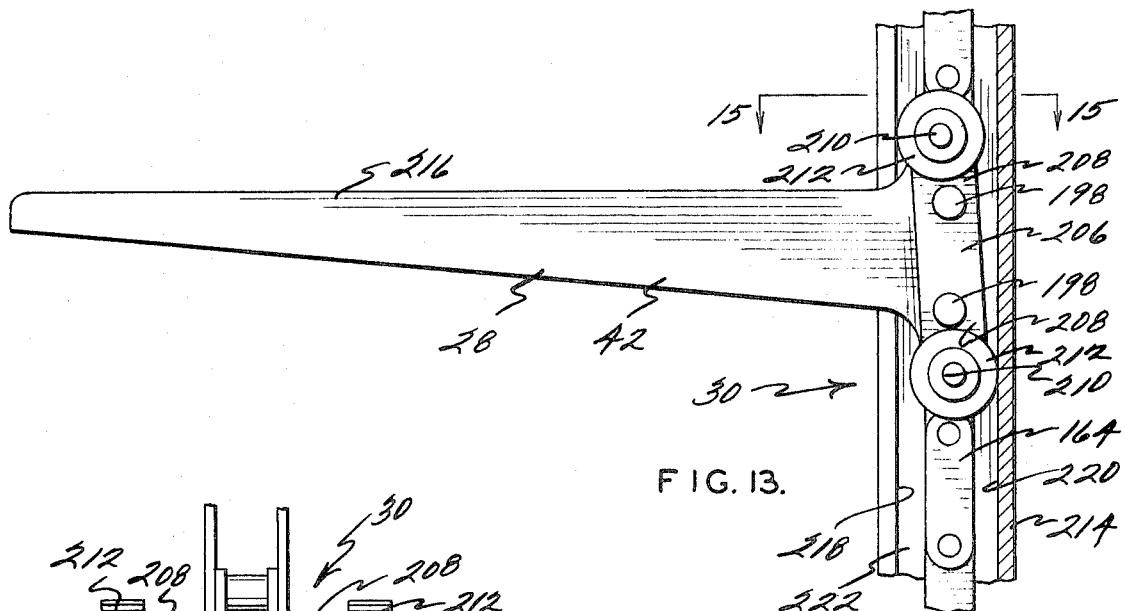
FIG. 13 is an enlarged fragmentary side elevation of the lifting arms and sprocket chain, portions of the track in the elevator column having been shown in section.

Next, reference will be made to FIGS. 13, 14 and 15 for a detailed description of the double-tined pickup arms 28 and the means of attaching same to the sprocket chain 164. At those locations on the sprocket chain where a pickup subassembly is to be mounted, the pivot pins are removed and elongated pins 198 are substituted therefor. The latter pins are about three times the length of the ordinary pins as shown most clearly in FIG. 14 and they have a head 200 on one end and a retaining pin 202 on the other.

Figure 15:
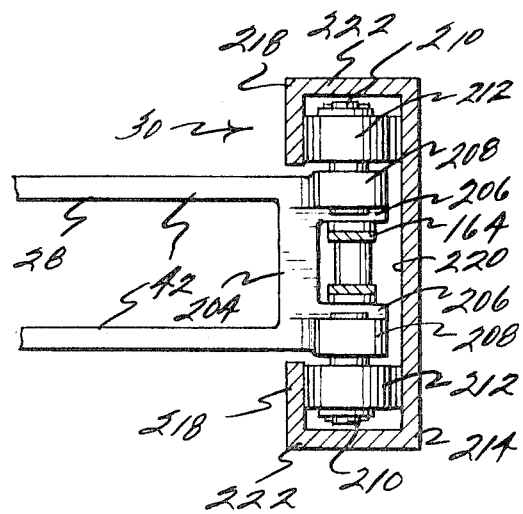
FIG. 15 is a fragmentary section taken along line 15-15 of FIG. 13.

Pickup arms 28 are parallel to one another as shown in FIG. 15 and they project horizontally in spaced relation as a part of a unitary casting having a transverse portion 204 joining the two arms together at their rear extremities. Extending rearwardly from transverse portion 204 are a pair of integrally cast spaced parallel mounting members 206 that receive the chain link therebetween and also have integral ears 208 projecting both above and below same. The hinge or pivot pins 198 aforementioned project from opposite sides of the chain link and into aligned openings in the mounting members 206.

Each of the four ears 208 also carries a stubshaft 210 projecting laterally therefrom that journals a trunnion 212 for rotational movement about an axis paralleling the axes of hinge pins 198, but spaced well above and below the latter. The resulting structure is not unlike a four-wheeled dolly having the tines 42 of the pickup arms 28 projecting from one side thereof. These trunnions 212 lie well outboard of the pickup arm tines as well as the supporting structure upon which they are journaled; therefore, the subassembly is free to move within the channel-shaped tracks 214 provided within the elevator shaft that will be described presently. Before doing so, however, it would be advisable to explain the pickup arms 28 in a bit more detail.

The tines 42 are spaced apart a distance such that they will pass on opposite sides of one of the conveyor rollers in the manner shown in FIG. 3. Each tine has the form of a thin, generally triangular blade of a length selected to extend beneath a newspaper bundle well over half way. Note particularly in FIG. 13 that the upper edge 216 of the tines 42 upon which the bundle rests is so designed that it is substantially horizontal when the upper trunnions are biased forwardly against the front inturned flanges 218 of track 214 and the lower trunnions are riding against the rear wall 220 thereof.

Figure 14:
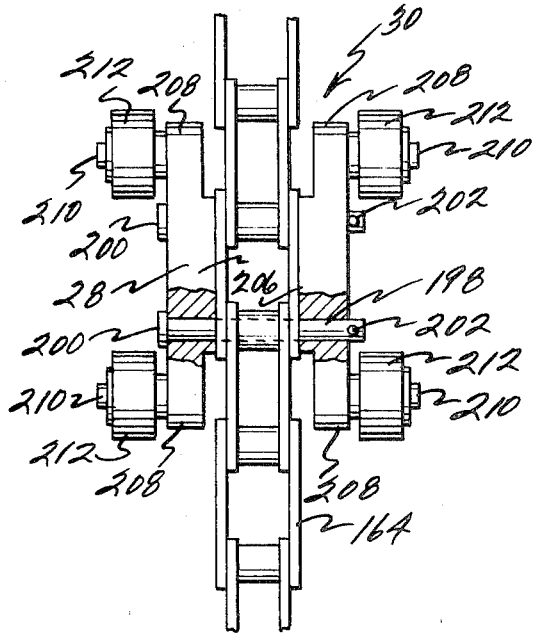
FIG. 14 is a rear elevation of the chain and double-tined lifting arms of FIG. 15, except that the track has been removed.

Returning once again to FIGS. 3, 4 and 5 and considering these along with FIGS. 14 and 15, it will be seen that the tracks 214 are mounted on opposite sides of the elevator shaft 14, both front and rear. The front tracks are identical to one another and have been given reference numeral 214F to distinguish same from the rear pair 214R. The front tracks 214F comprise front-opening channels, the web of which defines the rear wall 220 against which the lower pair of trunnions ride as shown in FIG. 13. The flanges 222 are spaced apart laterally a distance sufficient to accept the trunnion pairs therebetween and the free margins are inturned as at 218 to provide the surfaces against which the upper pair of trunnions roll. These selfsame elements are present in the rear tracks 214R and they serve the same purpose except, of course, that the pickup fingers are unloaded and the positions of the trunnion pairs are reversed as the arm subassemblies descend down the back of the elevator shaft.

Figure 5:
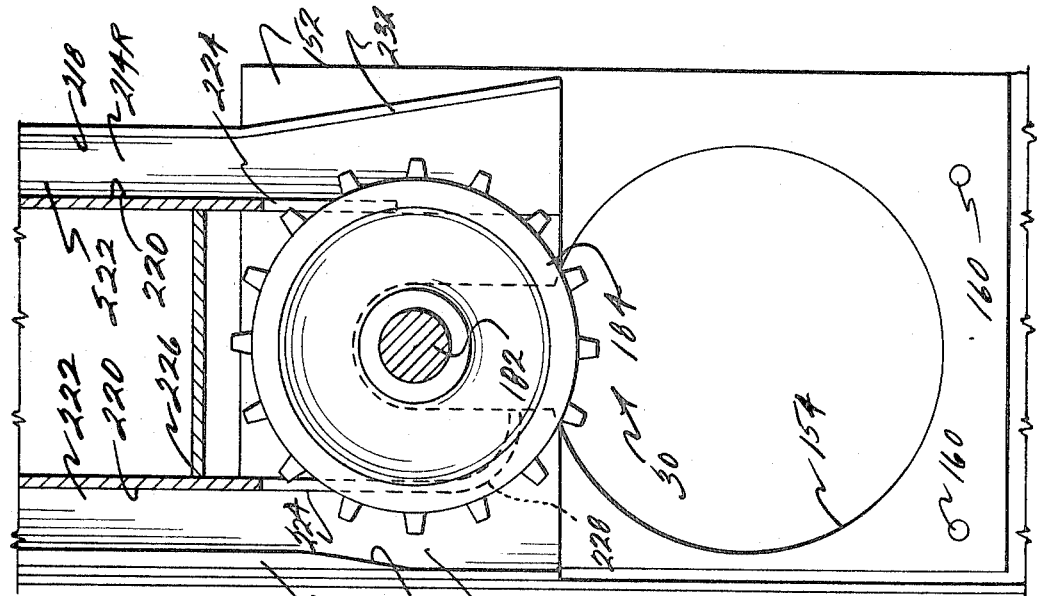
FIG. 5 is a fragmentary section taken along line 5-5 of FIG. 4 to the same scale.
Figure 4:
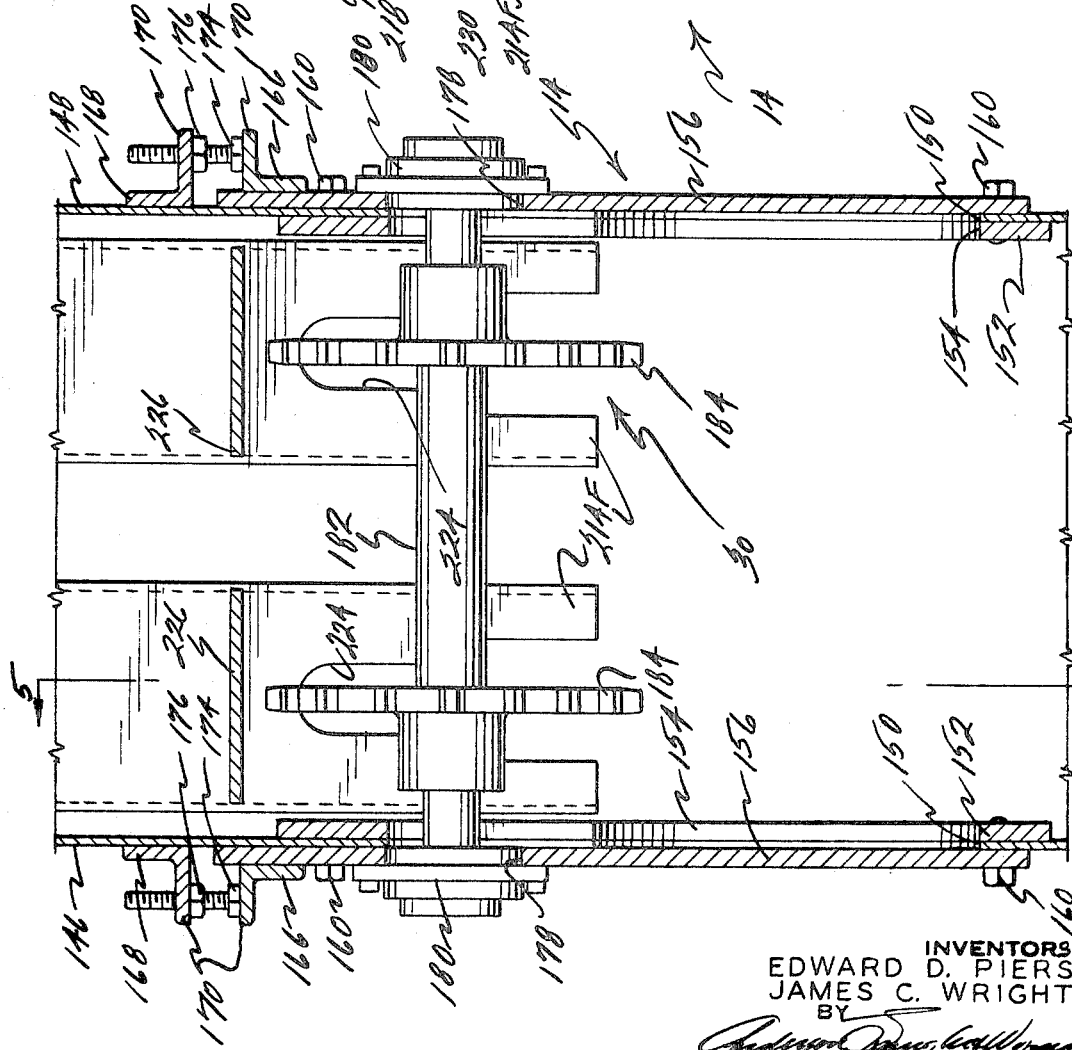
FIG. 4 is a fragmentary section taken along line 4-4 of FIG. 3 to the same scale as the latter.

All four tracks are provided with vertical slots 224 to receive the sprockets 184 and the chains engaging same, these slots in the lower ends of the front tracks having been shown in FIG. 4 and in both the front and rear tracks in FIG. 5. A similar arrangement is, of course, provided at the upper end of the elevator shaft although it has not been specifically illustrated. The front and rear tracks on the same side of the shaft are held in fixed-spaced relation by connecting plates 226 that can be seen in both FIGS. 4 and 5.

In FIG. 5, it can be seen that the web 220 curves inwardly at the lower extremity 228 of the front tracks adjacent slot 224 so as to guide the trunnions into the track as they leave the sprockets. The inturned flanges 218, on the other hand, are chamfered as indicated at 230 so as to provide a cam surface cooperating with the curved portions 228 of web 220 to define a tapered entryway for the trunnions.

On the rear tracks 214R, the inturned flanges 218 flare rearwardly at 232 where the trunnions are first picked up by the sprocket gears. At this point, the web 220 is eliminated near the bottom of slot 224 as it is no longer needed to guide the trunnions, the latter function being performed by the sprocket gears.

Figure 16:
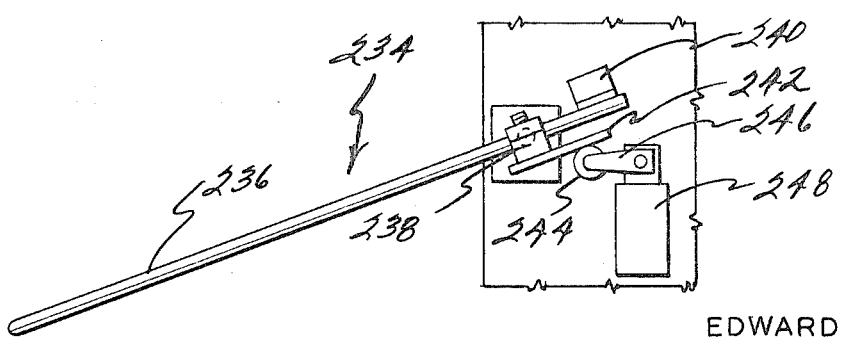
FIG. 16 is an enlarged fragmentary detail showing the misalignment bail.

We thus have an apparatus capable of sensing the presence of an incoming bundle, stopping same at the proper place in front of the elevator while pushing it back thereagainst, and lifting the bundle free of the delivery conveyor. At this point, the bundle should be securely tied and be sitting squarely atop the pickup arms for movement up the outside of the elevator shaft preparatory to being discharged at a higher level. There remains, of course, the possibility that the bundle tie has broken or the bundle has become misaligned for some reason. If this should occur, it is best to stop the unit and correct the difficulty before the bundle rises so high it becomes relatively inaccessible. Accordingly, an alignment subassembly, that has been indicated in a general way by reference numeral 234, is provided for the purpose of shutting down the elevator should a misaligned or broken bundle be lifted free of the conveyor 12. This unit has been shown in FIGS. 1, 2 and 16 to which specific reference will now be made for a detailed description thereof.

A U-shaped wire bail 236 is pivotally attached to opposite sides of the elevator shaft so as to project out over the conveyor 12. The bail is sized to easily pass a bundle therethrough that has been squared-up against the elevator by retractable stop 18 and bundle pusher 20 preparatory to being lifted by the pickup arms. The parallel side arms of the bail are adjustably mounted within pivot blocks 238 mounted on the sides of the elevator shaft for pivotal movement about a common horizontal axis. By being able to adjust the bail back and forth within these pivot blocks, the degree of misalignment that can be tolerated before the shutoff mechanism operates can be varied over wide limits. The free ends of the parallel side arms of the bail that project beyond the pivot blocks preferably carry small counterweights 240 (FIG. 16) as shown.

Attached to the underside of one of the pivot blocks is a switch-actuating arm 242 that contacts the roller 244 on the operating arm 246 of normally closed microswitch 248. At such time as a broken or misaligned bundle strikes the bail and lifts same slightly, the normally closed switch 248 will be actuated into open position so as to deenergize the drive mechanism 192 and shut down the unit until the abnormal condition can be corrected.

While on the subject of automatic shutoff devices, it would be well to describe the safety-gate subassembly that has been broadly indicated by reference numeral 250 and which is revealed in FIGS. 1 and 2 to which specific reference will now be made. Located at the top of the elevator shaft are a pair of side panels 252 that parallel the sides of said shaft and project forwardly therefrom out alongside the uppermost bundle discharge station which will be described presently. These side panels are mounted for vertical pivotal movement about a common horizontal axis defined by pivot pins 254. Since the gates have their points of pivotal movement located well to the rear of their centers of mass, they tend to gravitate counterclockwise as viewed in FIG. 2 against stop-forming blocks 256 shown in FIG. 2. In this, their normal position, the gates contact the actuator 258 of normally open switch 260 and hold it closed to complete the circuit to drive mechanism 192. Whenever a bundle rises clear to the top of the elevator without being discharged onto one of the unloading stations, it will strike crosspiece 262 connected across the top of the elevator between the side panels 252 and lift the assembly so that switch 260 can return to its open position and shut off the drive means 192. There is no possibility, therefore, of the bundle going over the top of the elevator and down the inside of the elevator shaft. Also, the above-described safety-gate prevents personnel who may be riding up the unit from being injured. Gate subassembly 250 performs a different function from that of bail 236 as the former can be actuated by even a properly aligned bundle.

As far as the mechanical apparatus is concerned, about the only thing left that has not already been described in detail are the one or more discharge stations indicated broadly by reference numeral 266 and which are shown most clearly in FIGS. 1, 2, 10, 11 and 12 to which specific reference will now be made. Each discharge station includes a conveyor 268 (broken lines in FIG. 2) running across in spaced relation in front of the elevator. These conveyors are stacked one above the other in vertically spaced parallel relation, but outwardly of conveyor 12 a distance sufficient to clear the elevator pickup arms 28 along with the bundle supported thereon. Each station also includes a bundle discharge subassembly indicated in a general way by numeral 270 operative upon actuation to push the bundle off the pickup arms supporting same and onto the adjacent conveyor 268.

In many respects, the bundle discharge subassembly 270 is not too different structurally from the bundle subassembly 20 used to load the elevator. For instance, it has a single pneumatic line 272 entering a solenoid-operated two-way valve 274 with lines 276 and 278 emerging therefrom connected into opposite ends of pneumatic servomotor 280. This motor is fastened in horizontal position to a mounting plate 282 that mounts within the elevator shaft on cross frame elements 284 and 286 thereof between the chain tracks 214 as shown in FIG. 11. The rear end of the cylinder 288 of the servomotor attaches to an L-shaped mounting bracket on the mounting plate while the piston rod 292 moves forward and back relative to a transversely extending faceplate 294. On the forward extremity of the piston rod is mounted pusher plate 296 which moves in response to actuation of the servomotor out between the two horizontally spaced pairs of bundle-supporting tines 42 and, in so doing, push any bundle riding thereon off onto one of the discharge conveyors 268.

As was the case with the previously described pusher subassembly 20, the instant subassembly 270 includes a guide rod 298 that attaches to the rear face of pusher plate 296 and also reciprocates within faceplace 294. The rear end of the guide rod includes a roller-type switch actuator 300 which, in the fully retracted position shown in FIG. 10, engages the operating arm 302 of microswitch 304 which is, in turn, operatively connected to valve 274 as will be explained in greater detail presently. At this point, it is sufficient to point out that the presence of a bundle at a given discharge station is sensed automatically and valve 274 is actuated so as to deliver air under pressure through line 276 to the rear of the servomotor cylinder 288. The piston immediately extends, pushing pusher plate 296 ahead thereof. The latter element engages the rear face of a bundle rising in front thereof and pushes it off the tines onto the adjacent discharge conveyor 268. The elevator need not stop while the bundle is being removed therefrom. Once the pusher has reached its fully extended position as shown in full lines in FIG. 2, roller 300 carried by guide rod 298 engages the operating arm 306 of a second microswitch 308 which deenergizes solenoid valve 274, thus reversing the flow of air to the servomotor and retracting the piston rod preparatory to receiving another bundle.

In FIG. 11, it will be seen that switch 304 is mounted atop member 310 for longitudinal adjustment within slot 312 provided therein. The same type of adjustment is, of course, provided for the other switch 308. By being able to adjust these two switches forward and back independently of one another, the initial and final positions of the plate can be regulated, as well as the stroke of the servomotor.

In the preferred embodiment of the invention illustrated in FIG. 10, each bundle discharge subassembly 270 comprises an interchangeable module having "quick-disconnect" air and electrical lines that enable one such subassembly to be substituted for another almost instantaneously. In so doing, one module can be pulled out for service or repair and another installed in its place with very little, if any, down time. Also, the user can purchase a simple form of the elevator with, say, only a single discharge station and add others to the unit as the need therefor arises.

Figure 17:
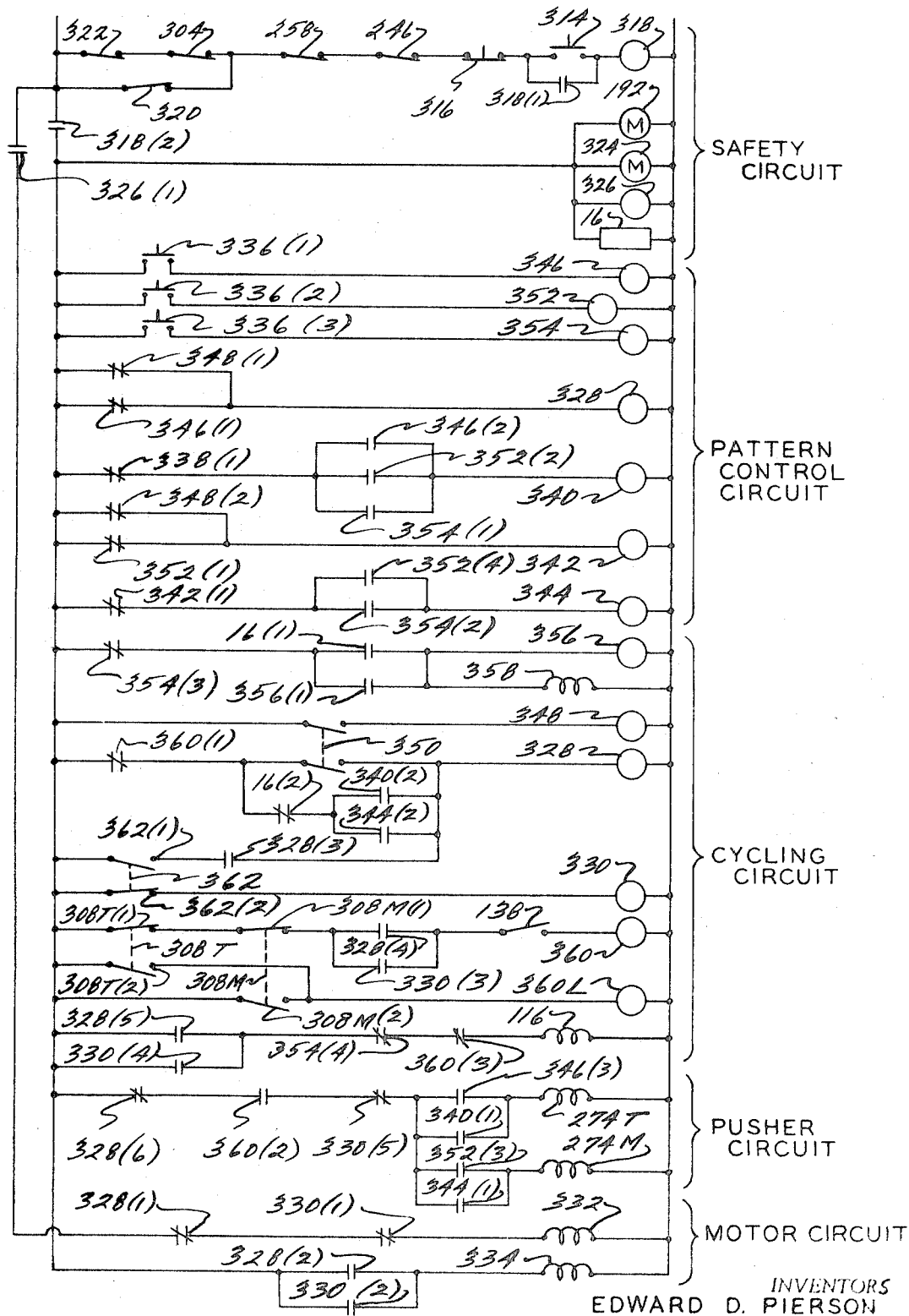
FIG. 17 is a schematic circuit diagram showing the control circuitry for operating the elevator.

Referring, finally, to FIG. 17, the control circuitry for operating the elevator just described will now be set forth in detail. This control circuit has, of course, been simplified to correspond to the elevator illustrated in FIGS. 1—16 that has only three discharge stations, it being understood that such a system is adequate to show all of the several functions performed by the unit, even though an actual newspaper plant installation would likely have several more such stations.

The control circuit for the elevator is quite a bit more complex than one might expect it to be for reasons that will be set forth as the detailed description proceeds. It should suffice for the present to point out that it is divided into five subcircuits, namely, (1) the safety circuit, (2) the pattern control circuit, (3) the cycling circuit, (4) the pusher circuit, and (5) the motor circuit. For the sake of simplicity and, admittedly, at some sacrifice in a logical presentation, the above order will be followed in the detailed description that follows.

The safety circuit, of course, overrides all other subcircuits and dictates when the elevator should be running and when it should shut down. As previously mentioned, there are several devices on the elevator which, whenever a bundle becomes misaligned, shut it down before it can damage itself. Also included in this safety circuit are start switch 314 and stop switch 316. Connected in series with switches 314 and 316 is the power control relay 318 and normally closed switches 248, 304 and 322 and normally open switch 260. Switch 320 is connected in parallel with switches 304 and 322, but in series with the previously mentioned components, namely, 260, 248, 316, 314 and 318. Element 248 is, of course, the normally closed switch movable to open position when a misaligned bundle strikes and raises bail 236. Element 260 is the normally open switch at the top of the elevator which will open whenever a bundle strikes the crosspiece 262 bridging between safety gates 250 and lifts them to keep the bundle from going over the top. Element 304 is, conversely, the normally closed switch at the rear of the bundle-pusher subassembly at the second level which is held open when the pusher 296 is fully retracted as seen in FIG. 10. Element 322 has not been shown in other FIGS. of the drawing, but it is a switch identical in action, location and function to switch 304 located at one of the other levels. Normally closed switch 320 is shown in FIG. 3 and is located inside the elevator in the path of the returning arms 28. It is of the normally closed type that is opened intermittently as the various flights pass and actuate same. If either switches 304 and 322 are open indicating that one of the pushers 296 is not fully retracted, the unit will continue to function through normally closed switch 320 until the next flight strikes the latter and actuates it to open position. By so doing, the unit will shut itself down before a bundle can come up in under the extended pusher and damage same before it can get back out of the way.

With the above background, it can be seen that, when power control relay 318 is energized, it will close its normally open contacts 318(1) and 318(2). When contacts 318(1) close, they will hold relay 318 energized so that start switch 314 can be released to open position. Closure of normally open contact 318(2) energizes drive mechanism 192 to start the elevator. Connected in parallel with drive mechanism 192 is a second drive mechanism 324 shown only in FIG. 17 which drives roller conveyor 12 that delivers the incoming bundles to the elevator.

Also connected in parallel with drive mechanism 192 and drive mechanism 324 is a relay 326 which, upon energization, brings about a closure of its normally open contacts 326(1) in a line paralleling that containing contacts 318(2) of relay 318. Closure of contacts 326(1) acts through normally closed contacts 328(1) and 330(1) of relays 328 and 330 so as to energize the normally engaged solenoid-released brake 332 that sets a brake on one of the shafts 188 that drives the elevator chains. During this same period in the operating cycle, the normally disengaged solenoid-actuated clutch 334 remains deenergized through normally open contacts 328(2) and 330(2) of the aforementioned relays 328 and 330. When solenoid-actuated clutch 334 is thus disengaged, it disconnects the drive mechanism 192 which is now running from drive shaft 188. Relay 326 is of the time-delay type operative to "hold" in actuated condition for a predetermined interval after the circuit by which it is initially energized has been broken. The reason for bringing this relay together with the brake 332 and clutch 334 of the motor circuit into the description of the safety circuit is because these elements cooperate to bring about an automatic shutdown under certain conditions; however, a detailed description of what occurs is best deferred until the functions and operations controlled by relays 328 and 330 that have contacts [328(1) and 330(1)] in the braking circuit have been more fully set forth.

Next below the safety circuit in FIG. 17 is the pattern control circuit which will now be described with reference thereto. Switch 336 is activated when relay 318 is energized so as to close its normally open contacts 318(2). Switch 336, though activated as aforesaid, requires some further action on the part of the elevator operator to initiate any functional response. In the particular form shown, switch 336 has three sets of mechanically interlocked contacts 336(1), 336(2) and 336(3) which are all shown "open." These contacts are closed manually by the operator and are so designed that, when any one set is closed, the other two remain open and cannot be closed. Contacts 336(1) program the elevator to discharge bundles at its top level, contacts 336(2) at an intermediate level and contacts 336(3) program the unit to move the bundles right past the elevator on conveyor 12 without elevating them at all. Obviously, the single set of contacts 336(2) are intended as being representative of several such sets that are usually employed to discharge the bundles at several intermediate levels located between the bottom and the top.

The remainder of the pattern control circuit is used to insure that all the bundles have been delivered in accordance with a previously selected pattern when the pattern is changed. For instance, it it possible to be sending bundles to the top level or an intermediate level and change the pattern to discharge at the bottom level even while the bundles are in transit. When this is done, the incoming bundles must be routed in accordance with the newly selected pattern while, at the same time, keeping those already in transit moving according to the old pattern. This clearing function is accomplished by relays 338, 340, 342 and 344 which will be described shortly. Before doing so, however, it should be pointed out that, when changing the pattern from a lower to a higher level rather than from a higher to a lower one, no clearing function is necessary as the bundles in transit are simply rerouted to the higher level. Also, in addition to the clearing function above-noted, this same circuit is employed to perform still another type of clearing operation, namely to finish out a given cycle even though no more bundles are being fed to the elevator so that it will not shut off with bundles remaining thereon in transit.

Assume, first of all, that contacts 336(1) of switch 336 are closed to energize relay 346 and thus set the elevator to discharge at its uppermost level. At this point, time-delay 338 has already been energized through the normally open contacts 318(2) of relay 318 that was actuated upon closure of the "start" switch 314 and the normally closed contacts 346(1) of relay 346. As soon as relay 346 is energized, its normally closed contacts 346(1) open and they would normally drop relay 338 out of the circuit if it were not for the parallel path thereto through the normally closed contacts 348(1) of relay 348 which has yet to be energized. Now, relay 338 is of the time-delay type wherein, following coil energization, the contacts do not actually close until an adjustable preset time interval elapses. Relay 342 in this same subcircuit is also of the time-delay type. Note that, if the current to either of these time-delay relay coils is interrupted before the time interval has elapsed at which they have been preset, none of their contacts will change state but, instead, the system will react in the same way as if the coils had never been energized.

Now, with relay 346 energized to close contacts 346(2) thereof, it would appear that relay 340 would be energized through the normally closed contacts 338(1) of time-delay relay 338; however, this is seldom the situation because relay 338 becomes energized through contacts 318(2) and 348(1) the instant the "start" switch 314 is closed. As soon as relay 338 thus energized "times-out," it will open contacts 338(1) and leave them open as long as the relay controlling same remains energized. The only time relay 340 can be energized, therefore, is upon deenergization of time-delay relay 338 and the latter can only occur with contacts 336(1) in closed position by a bundle striking limit switch 350 to energize relay 348 and open its normally closed contacts 348(1). The instant the bundle moves away from the bundle-stop 40 and allows limit switch 350 to reopen, relay 348 energized thereby also drops out and its contacts 348(1) reclose to, once again, energize relay 338. Its contacts 338(1) remain closed to energize relay 340 through 346(2) until relay 338 times-out again and reopens its contacts 338(1). Thus, while contacts 338(1) are normally closed, they remain open nearly all the time except during the brief interval during which a bundle is in transit all the way to the top of the elevator. It becomes necessary to energize relay 340 and change the state of its normally open contacts 340(1) that actuate the top level bundle-pusher 296 at the proper time and 340(2) that are included in a shunt circuit to relay 328 around switch 350 which will be described presently. Note that, whenever relay 346 is deenergized signifying that contacts 336(1) are open, relay 338 is energized through normally closed contacts 346(1) so that contacts 338(1) are left open and relay 340 deenergized. Once time-delay relay 338 has been deenergized by a bundle operating limit switch 350 and reenergized when the bundle moves away from the latter switch allowing it to reopen, nothing can interrupt the clearing cycle to the top level short of something causing relay 318 to reopen. Accordingly, if after contacts 336(1) have been closed and a bundle has started up the elevator after momentarily closing limit switch 350, shifting switch 336 to either of its lower level contacts 336(2) or 336(3) cannot interrupt the top level clearing procedure through relay 340. If, for example, just after a bundle started up the elevator, contacts 336(2) were closed to reopen contacts 336(1), the bundle would move all the way to the top and be discharged in the same way as if no change had been made in switch 336. The instant relay 338 became deenergized when contacts 348(1) opened, contacts 338(1) returned to their normally closed state and energized relay 340 through closed relay contacts 346(2). When relay 338 reenergized as the bundle left the stop 40 and allowed switch 350 to reopen, it initiated the time sequence during which contacts 338(1) would be left closed. Now, with this condition existing, changing switch 336 from contacts 336(1) to 336(2) or 336(3) only effects the path by which relay 340 is kept energized. In other words, normally open contacts 346(2) of relay 346, normally open contacts 352(2) of relay 352 and normally open contacts 354(1) of relay 354 are all connected in parallel with one another and in series with contacts 338(1) and relay 340; therefore, with contacts 338(1) closed and one of the three switch contacts 336(1), 336(2) or 336(3) closed, relay 340 must be energized and remain so until relay 338 times-out. About the only thing that could keep a bundle from clearing the top level at this point in the operating cycle would be to open all three contacts of switch 336 or to have relay 318 open either by opening "stop" switch 316 manually or having an element in the safety circuit do so automatically.

As far as clearing a bundle in transit all the way to the top of the elevator is concerned, the operation of the pattern control circuit just described remains the same whether switch 336 is reprogrammed to shift the discharge station from the top level to the intermediate level controlled by contacts 336(2) or from the top level all the way to the bottom level controlled by contacts 336(3). In other words, closing 336(3) instead of 336(2) merely energizes relay 354 and closes its normally open contacts 354(1) to provide still another parallel path to relay 340; but, otherwise, the components that control relays 338 and 340 act in precisely the same way regardless of which of the two contacts 336(2) or 336(3) are actuated after contact 336(1).

Next, the pattern control circuit will be examined to see what happens if switch 336 is initially set to discharge at an intermediate level by closing contacts 336(2) instead of 336(1). With contacts 336(1) open and relay 346, therefore, deenergized, its normally closed contacts 346(1) will remain closed to energize relay 338. With relay 338 thus energized, its normally closed contacts 338(1) will open after said relay has timed-out to drop relay 340 from the circuit and leave it out so long as contacts 336(1) remain open. Accordingly, we can disregard relays 338 and 340 and concentrate our attention on relay 352 that became energized upon closure of switch contacts 336(2) and to the two relays that still respond to a change in state of its contacts, namely, relays 342 and 344.

As was the case previously with regard to relay 338, the other time-delay relay 342 becomes energized immediately upon closure of the "start" switch 314 because of the completed path thereto through contacts 318(2) and the normally closed contacts 352(1) of relay 352 assuming, at this point, that none of the contacts of pattern control switch 336 have been closed as yet. When relay 342 becomes energized and times-out, its normally closed contacts 342(1) will open and drop relay 344 from the circuit until such time as relay 342 is deenergized again.

Now, when contacts 336(2) are closed to program the elevator to discharge at an intermediate level, relay 352 connected in series therewith becomes energized and its normally closed contacts 352(1) open and remain open so long as said pattern control switch 336 remains in this position; therefore, the only way left to deenergize relay 342 is to open the normally closed contacts 348(2) of relay 348 controlled by limit switch 350. When an incoming bundle strikes the bundle stop 40, switch 350 is closed momentarily to energize relay 348 connected in series therewith and this, in turn, opens normally closed contacts 348(2) to deenergize relay 342. The instant relay 342 becomes deenergized, its normally closed contacts 342(1) reclose and energize relay 344 through the normally open contacts 352(4) of relay 352 that closed when contacts 336(2) were first closed. When the bundle starts moving up the elevator, it will release switch 350 to its normally open position, thus deenergizing relay 348 and returning its normally closed contacts 348(2) to their closed position so as to reenergize time-delay relay 342. The latter relay's contacts 342(1), however, remain closed to energize relay 344 for the preset time interval required for the bundle to rise to the appropriate intermediate level and be discharged from the elevator. Once relay 342 has timed-out, its contacts 342(1) reopen and drop relay 344 out of the circuit until another bundle actuates switch 350.

If, as before, the discharged pattern was changed from the intermediate level to the lower level while a bundle was in transit, the circuit would function to raise said bundle to the previously programmed higher level and discharge same before shifting over to the bottom level. A bundle "in transit" as used herein means that it is on its way up the elevator and this, of course, presupposes that it has already actuated limit switch 350 and moved away therefrom so that it can return to its normally open position. Note that, if pattern control switch 336 is actuated to change the level at which the bundle is discharged before a bundle strikes limit switch 350 and with no bundle "in transit," the incoming bundle will merely be delivered in accordance with the pattern selected as there is no necessity for any "clearing" function to be performed.

Accordingly, consistent with the above, if we assume that a bundle is "in transit" to the intermediate level when pattern control switch 336 is shifted from contacts 336(2) to bottom level contacts 336(3), the following procedure will take place to clear said bundle to the second level. Time-delay relay 342 would already have been deenergized and reenergized due to the momentary closure of limit switch 350. Thus, when relay 352 is deenergized by opening switch contacts 336(2), the fact that its normally closed contacts 352(1) reclose is immaterial in that relay 342 has already been energized through contacts 348(2) that are now closed. Likewise, the deenergization of relay 352 and the resultant reopening of its contacts 352(4) has no effect on relay 344 because the latter is now energized through closed contacts 342(1) of the time-delay relay and the normally open contacts 354(2) of relay 354 that are connected in parallel with contacts 352(4) and which closed with the energization of relay 354 upon closure of switch contacts 336(3). Relay 344 will, as before, remain energized until time-delay relay 342 times-out and reopens its contacts 342(1) upon discharge of the bundle from the intermediate level. Note, once again, that with the bundle "in transit" up the elevator, nothing will prevent its being cleared provided one of the pattern control switch contacts 336(1), 336(2) or 336(3) are closed and that relay 318 of the safety circuit remains energized.

Before going on to a description of what happens when the low level contacts 336(3) of the pattern control switch are actuated, it might be well to explore first how the circuit responds to a pattern change from an intermediate level to a higher level with a bundle in transit. If such were the case, relay 352 would be energized as would relays 342 and 344.

Relay 342 would be in the process of timing-out preparatory to reopening its contacts 342(1) to drop relay 344 out after the bundle had been discharged from the intermediate level. In this situation, even though contacts 342(1) remain closed until relay 342 times-out and reopens them, relay 344 is instantly deenergized when the pattern control switch 336 is actuated to open contacts 336(2) and close contacts 336(1) because, as soon as contacts 336(2) open, relay 352 deenergizes to return its normally open contacts 352(4) to their open positions. Since, in this instance, the only other current path available to relay 344 is through the normally open contacts 354(2) of relay 354 and the latter is not energized unless contacts 336(3) are closed, there is no way to keep relay 344 in the energized state and it drops out even though time-delay relay 342 has yet to timeout. With relay 344 out of the circuit, the intermediate level bundle pusher assembly 270M that is dependent thereon for actuation, as will be shown presently, is rendered inoperative. The net result of all this is the passage of the bundle "in transit" all the way up to the preselected higher level for discharge in accordance with the procedure described initially herein.

The remaining thing that needs to be examined in connection with the pattern control circuit is what occurs when the pattern selection switch 336 is set on bottom level discharge by closing its contacts 336(3). Note here that, instead of the bundle being discharged onto another conveyor from the elevator as is the case with all levels above the first, in this situation, the bundle merely moves right on past the elevator on conveyor 12. The main thing that needs to be done before this can happen is to drop the bundle stop 40 out of the way so that the bundle can move on past the elevator.

In much the same manner as before, closing contacts 336(3) of switch 336 energizes relay 354 connected in series therewith. This causes its normally open contacts 354(1) and 354(2) to close; however, this is without effect because the time-delay relay contacts 338(1) and 342(1) connected in series therewith are both open at this point due to the fact that the relays 338 and 342 controlling same are both energized and have timed-out, assuming no bundle is "in transit" up the elevator. Therefore, we can ignore contacts 354(1) and 354(2) of relay 354 whose only function is in connection with clearing the elevator as has already been explained in considerable detail. We do find, however, that relay 354 has a set of normally closed contacts 354(3) connected in one series circuit containing the normally open contacts 16(1) of photocell 16 and relay 356, along with a second series circuit paralleling the one above that contains the normally open contacts 356(1) of relay 356 and the solenoid valve 358 which, upon energization, functions to raise the bundle stop 40. For the present, it should suffice to point out that, with contacts 336(3) of the pattern selector switch 336 closed to energize relay 354, the normally closed contacts 354(3) of the latter will open, thus leaving bundle stop 40 retracted beneath the surface of conveyor 12 so the bundles can pass straight through thereon. Since there are no clearing functions to be performed at the lowest level or, for that matter, any elevating and bundle-discharge functions, the bottom level pattern control is practically nonexistent.

The next section of the control circuit, namely, the cycling circuit, is also reasonably complex and will now be set forth in detail. Raising and lowering the bundle stop 40 is considered a part of the cycling circuit and, as noted above, this stop is normally retracted and remains in retracted position except when solenoid valve 358 is actuated. As mentioned previously, whenever contacts 336(3) of the pattern control switch are closed to energize relay 354 and open its normally closed contacts 354(3), solenoid valve 358 cannot be actuated to raise the bundle stop. On the other hand, whenever safety circuit relay 318 is closed and relay 354 is deenergized, it becomes possible to raise the bundle stop 40 by actuating valve 358 in the following manner.

Photocell 16 is represented in FIG. 17 as the component connected in parallel with drive mechanisms 192 and 324, along with relay 326, so as to be energized at all times that safety circuit relay 318 is energized. The photocell must, of course, be supplied with energy at all times to operate the lamp contained therein, along with its coil, so, in this sense, the photocell is different from the other components of the circuit. This particular photocell includes a time-delay function which is quite similar to that of previously described relays 338 and 342.

The operation of photocell 16 is conventional in that its normally open contacts 16(1) respond to the interruption of the light beam by an incoming bundle on conveyor 12 by closing. Upon closure of these photocell contacts, a circuit is completed to energize relay 356 whenever relay 318 is energized and relay 354 is deenergized signifying that the pattern control circuit is set to discharge bundles either at the top level or an intermediate one. The normally open contacts 356(1) of relay 356 close when the latter becomes energized so as to actuate solenoid valve 358 and raise the bundle stop 40 up between the rollers of conveyor 12 into the path of the incoming bundle. Note that relay contact 356(1) is connected in a shunt circuit around photocell contacts 16(1) so as to keep relay 356 energized along with the solenoid valve 358 when contacts 16(1) reopen due to the bundle moving out of the path thereof. This, of course, leaves the bundle stop 40 up in its "bundle-intercept" position at all times except when the safety circuit deenergizes relay 318 to open its contacts 318(2) or relay 354 is energized by placing the pattern control switch 336 in the bottom-discharge or "straight-through" mode.

Once the bundle has interrupted the photocell to close its contacts 16(1) and raise the bundle stop 40, it continues on conveyor 12 until it closes normally open limit switch 350 and energizes relay 348 as previously mentioned. If normally closed contacts 360(1) of relay 360 are closed at this time, and we will assume for the present that they are, then a parallel circuit is also completed to relay 328 through 360(1) and limit switch 350. Since limit switch 350 will stay closed only momentarily while the bundle rests against stop 40, some means must be provided for holding relay 328 energized when switch 350 reopens due to the bundle starting up the elevator. This is accomplished by any one of three different shunt circuits around switch 350. Two of these shunt circuits include a pair of normally closed contacts 16(2) belonging to the photocell 16, along with one of the normally open contacts 340(2) or 344(2) of relays 340 and 344. The only time contacts 340(2) will close, however, is when the pattern selector switch is set to close contacts 336(1) and the bundle is "in transit" up the elevator to the top level with relay 338 energized and timing-out prior to reopening its contacts 338(1). Similarly, the only time contacts 344(2) will close is when the selector switch 336 is actuated to close contacts 336(2) and relay 342 is energized and timing-out prior to reopening its contacts 342(1). Thus, if we have a bundle "in transit" up to either an intermediate level or the top level and, in addition, there is no bundle on conveyor 12 in position to interrupt the beam from photocell 16 so as to change this state of its normally closed contacts 16(2), then relay 328 will remain energized even though limit switch 350 has reopened. If, on the other hand, there is no bundle in transit up the elevator that would result in the closure of either 340(2) or 344(2) or a bundle is interrupting photocell 16 so as to open its normally closed contacts 16(2), then the above-described shunt circuits around switch 350 become inoperative to hold relay 328 energized if, in fact, switch 350 has returned to its open position or contacts 360(1) are open. There remains, however, still a fourth way of holding relay 328, the other three being (1) directly through 360(1) and 350; (2) indirectly through 360(1), 16(2) and 340(2); and, (3) through 360(1), 16(2) and 344(2). This fourth path is totally independent of the above-mentioned components, namely, switch 350, photocell contacts 16(2) and relay contacts 360(1), 340(2) or 344(2). Instead, this circuit involves an independent path to relay 328 through the normally open contacts 362(1) of switch 362 and the normally open contacts 328(3) of relay 328 that are connected in series with one another and with relay 328. Now, switch 362 is, as shown in broken lines in FIG. 2, located in the path of the returning flights much the same as switch 320 but at different levels. Switch 320 is, as has been previously mentioned, normally closed except when opened by a passing flight moving downwardly therepast. Switch 362 is, likewise, actuated by the returning flights; however, it has both normally open contacts 362(1) and normally closed ones 362(2). The former limit switch 320 is used to indicate that the elevator has started to move and is so located that it will actuate immediately after the elevator has stopped and been restarted. It will be shown presently that the normal stopping point for the elevator is such that one of the flights lies in a position to actuate switch 362, this being the position most favorable for accepting a new bundle and starting the cycle over again.

Therefore, assuming for the present that the elevator has stopped in a position to actuate switch 362, its normally open contacts 362(1) will close and be ready to "hold" relay 328 energized at such time as an incoming bundle strikes the bundle-stop 40 so as to actuate limit switch 350 and energize said relay 328 along with its contacts 328(3), assuming contacts 360(1) remain closed. This portion of the cycling circuit is ready to accept an incoming bundle; but, before proceeding with an explanation of the actual operating cycle, it would be best if the state of other components in the cycling circuit were first determined. Accordingly, it is important to know the state of the limit switches controlling the movements of the top level and intermediate level pusher subassemblies 270T and 270M, along with limit switch 138 of the bundle-squaring subassembly 20, at the beginning of the operating cycle where switch 350 is open awaiting actuation by an incoming bundle, relay 360 is deenergized leaving its normally closed contacts 360(1) closed and switch 362 is actuated to close its contacts 362(1) in readiness to "hold" relay 330 once it becomes energized upon actuation of switch 350. Limit switch 308T at the front end of the top bundle-pusher subassembly 270T will be in its deactivated condition with its normally closed contacts 270T(1) closed and its normally open contacts 270T(2) open signifying that the pusher is in other than fully extended position. Similarly, the forward limit switch 308M of the intermediate bundle-pusher subassembly 270M will be deactuated so that its normally closed contacts 308M(1) will be closed and its normally open contacts 308M(2) will be open to signify that the pusher associated therewith is, at least partially, retracted.

Now, with both the intermediate level and top level bundle-pushers at least partially retracted, the state of the bundle-squaring subassembly 20 and its control switch 138 must be determined. This normally open limit switch 138 is connected in series with the normally closed contacts 308T(1) and 308M(1) of the intermediate and top bundle-pusher subassemblies described above, the normally open contacts 328(4) of relay 328 and relay 360. With the bundle-pushers retracted, the forward limit switches 308T and 308M thereof are deactuated, leaving their normally closed contacts 308T(1) and 308M(1) closed; therefore, as soon as an incoming bundle strikes the uplifted bundle stop 40 and actuates switch 350 to energize relay 328, its normally open contacts 328(5) connected in series with normally closed contacts 354(4) and 360(3) will close to actuate the bundle-straightener solenoid 116. Remember, contacts 354(4) remain closed at all times except when the pattern selector switch 336 is set to close its contacts 336(3) and allow the bundles to go straight through on conveyor 12. In this condition, the bundle-straightener 20 is not used and is, therefore, disabled by the inclusion of contacts 354(4) which open and drop out solenoid 116. Normally closed contacts 360(3) of relay 360 are, of course, closed at this point because this relay cannot be energized until limit switch 138 closes and the latter limit switch cannot close except when solenoid 116 actuates to extend pusher 104. From the foregoing, it becomes apparent why normally closed contacts 360(1) were originally assumed to be closed because, as just seen, relay 360 cannot be energized except upon the closure of bundle-straightener limit switch 138. Note, however, that relay 360 is of the latching type that, once energized, remains so until deenergized by energizing its latch 360L. This latch depends for energization upon one or the other of bundle-pusher subassemblies 270T or 270M being fully extended so as to actuate one of the forward limit switches 308 to close either pair of normally open contacts 308T(2) or 308M(2) connected in parallel with one another. Thus, when relay 360 energizes, its contacts 360(3) will open to deenergize straightener solenoid valve 116 and return the pusher 104 associated therewith to its original retracted position. As the pusher of the bundle-straightener retracts, it moves off switch 138, allowing it to reopen; however, relay 360 remains latched in energized condition as above-noted.

An orderly presentation demands that we leave the cycling circuit for the moment and skip down to the motor circuit because, otherwise, certain assumptions made previously with regard to the state of switch 362 and relay 328 will prove misleading. During the above discussion, we have assumed that the elevator stopped in a position such that switch 362 was actuated to hold relay 328 energized after switch 350 reopened. While this is true, relay 328 is actually held in this fashion only briefly because, just as soon as it energizes, its normally closed contacts 328(1) open to release the brake 332 and its normally open contacts 328(2) close to energize clutch 334 to form a driving connection between drive mechanism 192 and drive shaft 188. Thus, as the elevator begins to move, the flight that had been holding switch 362 actuated will have moved away and allowed it to return to normal position, thereby breaking the circuit to relay 328 unless, of course, it is being held energized in some other way, a circumstance that will be explored shortly. Note, however, that, as soon as switch 362 deactuates, its normally closed contacts 362(2) reclose and energize relay 330 connected in series therewith. When relay 328 deenergizes, its normally closed contacts 328(1) would, normally, reclose and reset the brake 332 were it not for relay 330 which, upon energization, opens its normally closed contacts 330(1) to keep the brake released. A similar situation exists with regard to the clutch 334 because, with relay 328 deenergized, its normally open contacts 328(2) will reopen and disengage said clutch were it not for the fact that relay 330 immediately energizes to close its normally open contacts 330(2) and keep the elevator running. Thus, the only time the elevator will be stopped is when switch 362 is actuated and normally open contacts 328(3) of relay 328 are open indicating that either contacts 360(1) are open or contacts 360(1) are closed without switch 350 having been actuated by an incoming bundle and neither of the shunt circuits around switch 350 are complete.

Returning once again to the cycling circuit, it will be seen that energization of relay 330 upon deactuation of switch 362 also closes a shunt circuit to latching relay 360 through normally open contacts 330(3) that will close when the normally open contacts 328(4) of relay 328 connected in parallel therewith reopen. Once again we find that, if either relay 328 or 330 are energized, the circuits containing normally open contacts thereof connected in parallel with one another will not change state due to a shift in which one of these two relays is energized and which is deenergized. Still another example of this same situation is in the bundle-straightener series circuit to solenoid valve 116. The normally open contacts 330(4) of relay 330 will close and maintain the circuit in the same condition when switch 362 deactuates to energize relay 328 so as to reopen its normally open contacts 328(5).

While on the subject of the effect of deactuating switch 362, it is only logical that brief reference be made to the pusher circuit to show the direct analogy between it and the brake circuit already described. In both of these circuits, normally closed contacts of these two relays are found connected in series with one another. Thus, in the pusher circuit, with relay 328 deenergized to return its normally closed contacts 328(6) to their closed position, the pusher solenoids 274M and 274T will remain deenergized because, upon deactuation of switch 362 and the resultant energization of relay 330, its normally closed contacts 330(5) will open and leave the valves as they were.

Back once again with the cycling circuit, we now have the following conditions existing. A bundle has arrived on conveyor 12, struck the bundle-stop 40 and actuated switch 350. The bundle-straightener has extended its pusher to square the bundle by means of solenoid valve 116 and limit switch 138 has closed to return said pusher to its original position. The brake 332 has been released and clutch 334 engaged to start the elevator. Latching relay 360 is holding in energized condition to break the circuit to relay 328 through contacts 360(1) and the shunt circuit to this same relay around contacts 360(1) and switch 350 is, likewise, open because the elevator has started and allowed switch 362 to return to its normal deactuated position. Forward limit switches 308M and 308T on the bundle-pushers remain in their normal deactuated positions preparatory to actuation when switch 362 again actuates as will appear presently. With relay 360 holding and its contacts 360(1) open, a second bundle arriving on conveyor 12 that strikes the bundle-stop 40 and closes switch 350 cannot energize relay 328 to start the elevating cycle over again. This is true even though switch 362 were to actuate again which, of course, it will do at intervals. The reason is that relay contacts 328(3) remain open and cannot close until relay 328 is energized by some other circuit. The other two paths to relay 328 both depend upon contacts 369(1) being closed which, as aforesaid, they are not. Thus, a bundle may be resting against the bundle-stop and holding switch 350 closed, but here it will stay until the latch 360L for relay 360 is energized to deenergize the latter and allow the cycle to commence once again.

The attention, therefore, is directed to the circuit to relay latch 360L to see how it is energized so as to drop out the relay 360 that is "holding" and reset the cycling circuit. A glance at this portion of the cycling circuit will immediately reveal that, when either of the forward bundle-pusher limit switches 308M or 308T is actuated, a circuit will be completed to relay latch 360L through the normally open contacts 308(2) of whichever switch actuates to close same. In other words, we have here another "in transit" condition wherein, once a bundle has started up the elevator, it cannot repeat the bundle-elevating cycle until the bundle in transit has cleared the elevator at either an intermediate level 270M or the top level 270T.

Proceeding next to the pusher circuit, the manner in which the aforementioned forward bundle-pusher limit switches 308M and 308T can be actuated will be explored. With relay 328 deenergized, its normally closed contacts 328(6) will be closed. Relay 360 is, of course, "holding" so its normally open contacts 360(2) will be closed. Normally closed contacts 330(5) of relay 330 will, however, be open because switch 362 is deactuated to close its normally closed contacts 362(2). One would suspect, therefore, that it is the reactuation of switch 362 with relay 328 still deenergized that actuates the bundle-pusher subassemblies; however, before pursuing this further, it would be wise to continue with an examination of the state of the contacts in the pusher circuit.

Both the intermediate level bundle-pusher solenoid valve 274T and the top level bundle-pusher solenoid valve 274T are connected in series with the aforementioned contacts 328(6), 360(2) and 330(5) and in parallel with one another so as to provide for independent operation. Each of these solenoid valves is, in turn, dependent for its actuation upon energization of one or the other of two relays, but not the same ones. For instance, connected in parallel with one another and in series with solenoid valve 274T are the normally open contacts 346(3) and 340(1) of relays 346 and 340, respectively. Solenoid valve 274M, on the other hand, has the normally open contacts 352(3) and 344(1) of relays 352 and 344 connected in series therewith and in parallel relation to one another.

Returning for the moment to the pattern control circuit if, as previously mentioned, level selector switch 336 is programmed to discharge at an intermediate level by closing its contacts 336(2), then relay 352 is energized and its normally open contacts 352(3) are closed readying solenoid valve 274M for actuation the instant switch 362 reactuates to deenergize relay 330 and reclose its normally closed contacts 330(5). This is the normal situation that would exist, the exception being the previously described "in transit" situation where the level selector switch was shifted to lower level contacts 336(3) before the bundle had been discharged at the intermediate level. Without going to the trouble of repeating the description of this clearing operation, it should suffice to point out that contacts 352(3) will open when the position of the selector switch 336 is changed; however, normally open contacts 344(1) will close and assume the function of contacts 352(3) because relay 344 actuates through normally closed relay contacts 342(1) and normally open contacts 354(2) that close when the selector switch is placed on contacts 336(3).

Exactly the same thing is true with respect to solenoid valve 274T except that different relays are involved. Under normal circumstances, the pattern selector switch 336 will have contacts 336(1) closed to energize relay 346 and close its normally open contacts 346(3) so that the solenoid valve 274T will energize whenever contacts 330(5) close. If, perchance, the pattern selector switch 336 has been changed from contacts 336(1) to either 336(2) or 336(3) before the "in transit" bundle has cleared the top of the elevator, contacts 346(3) will be open but their function taken over by contacts 340(1) which will close upon actuation of relay 340 through closed contacts 338(1) and contacts 352(2) or 354(1), one pair of which will close if the pattern selector switch is set on either 336(2) or 336(3).

Returning again to actuation of the pusher subassemblies 274M or 274T, whichever has been selected by the pattern control switch, this occurs at the instant switch 362 reactuates. Remember, the elevator is moving at this point and another flight is approaching switch 362. As soon as it arrives, the normally closed contacts 362(2) reopen and drop relay 330 out of the circuit once more. It is very important to note that power to its companion relay 328 is not restored even though normally open switch contacts 362(1) reclose because relay 360 is still holding energized to open the circuit to relay 328 through open contacts 360(1). At long last, the cycle is about complete because, just as in the beginning, relays 328 and 330 are both deenergized; however, certain other things must take place before the cycle is truly complete.

First of all, when relay 330 dropped out and relay 328 was not reenergized in its place, brake 332 reset because of the circuit restored through closed contacts 328(1) and 330(1). Simultaneously, clutch 334 was deenergized through open contacts 328(2) or 330(2) which immediately disconnected the elevator drive shaft from the motor. The elevator has thus come to a stop having traveled only the distance between adjacent flights. Moreover, it has stopped in a position such that switch 362 is actuated thereby and, for the first time, it can be seen that the original assumption was valid, namely, that the cycle starts with the elevator stopped in a position to actuate switch 362. Quite obviously, the distance separating discharge stations is either equal to or a whole number multiple of the spacing between adjacent flights or whatever means is used in place thereof to actuate switch 362. This, coupled with the location of switch 362, insures the fact that, whenever the elevator stops, there will be a bundle-supporting flight opposite each discharge station.

Keeping in mind the fact that the elevator has stopped and that a flight thereof is opposite each discharge station, then it becomes obvious that actuation of the pusher at such station would certainly discharge a bundle from the elevator if one were present. According, the instant relay 330 becomes deenergized, its normally closed contacts 330(5) reclose and, it will be remembered that this was the sole remaining thing needed to complete circuits to one pusher subassembly or the other. If, therefore, the bundle had stopped at intermediate discharge station 270M and the pattern selector switch 336 was set to close contacts 336(2), relay 352 would be energized and its normally open contacts 352(3) would close to actuate solenoid valve 274M, thus pushing the bundle off onto a discharge conveyor located alongside thereof. As valve 274M extends its pusher, the latter will strike and actuate forward limit switch 308M, closing its normally open contacts 308M(2) and completing the circuit at long last to relay latch 360L. When this relay latch energizes, it deenergizes relay 360 which has been "holding" in the energized state. As relay 360 drops out, its normally closed contacts 360(1) are restored to their closed position and the system is ready to begin its operating cycle all over again. If, during this period, a bundle has been resting against the bundle-stop holding switch 350 closed, then the cycle will immediately begin again; otherwise, it will await a new bundle striking the bundle-stop.

Quite obviously, if the pattern selector switch had been set on contacts 336(1), relay 346 would have been energized instead of 352 to close contacts 346(3) and extend the pusher at the top level rather than the intermediate one. If a bundle was present on the flight at the top level, it would be pushed off; but, if not, the pusher would extend anyway even though there was nothing in its path. The same thing is true of the intermediate level because both pushers operate whether a bundle is there or not and no attempt is made to sense their presence.

Another situation remains to be considered, namely, what happens if the elevator stops with the bundle at an intermediate level and the pattern selector switch 336 is set to discharge at the top level. There is, of course, no problem if there is another bundle in position already holding switch 350 closed or one on the way, because, as soon as relay 360 drops out, its contacts 360(1) reclose and the circuit is ready to go again. Also, by this time, the bundle-pusher solenoid 274 has deenergized when relay contact 360(2) opened, thus retracting the operative bundle-pusher and returning the forward limit switch 308 to its normal unactuated position, thereby indicating that everything is in readiness for the bundle to start running again.

In order to move the last bundle in a series or a single bundle all the way to the top level, some means must be provided for bypassing switch 350 because, in the previously described clearing cycles, it was necessary to close switch 350 in order to energize relay 348, the latter being required to clear to the top level. In this situation, however, there is nothing coming along to actuate switch 350. Relay 360 is again deenergized and contacts 360(1) are closed so that, if a shunt path around switch 350 could be completed to relay 328, the cycle would begin all over just as if switch 350 had closed. This is accomplished by the normally closed contacts 16(2) of photocell 16 connected in a shunt circuit around switch 350, which circuit also includes the normally open contacts 340(2) and 344(2) of relays 340 and 344, respectively, connected in parallel with one another. The photocell 16, as previously noted, remains deenergized as long as the light beam generated therein is not interrupted; but, as soon as the beam is broken, the photocell energizes to change the state of its contacts. Therefore, if a bundle is in position to actuate switch 350, it will also be in a position to interrupt the photocell beam and energize same so as to open its normally closed contacts 16(2), thereby disabling the shunt circuit which, of course, is not needed because a bundle is present to actuate switch 350 and restart the cycle. If, on the other hand, no bundle is present, the photocell will remain deenergized and contacts 16(2) will remain closed. Then, one of the delay circuits previously described in great detail that energize relays 340 or 344 will function to close their associated normally open contacts 340(2) or 344(2) and energize relay 328 to start the elevating cycle without switch 350 having been closed. This assumes, of course, that the system is programmed to discharge at a level above the bottom one because, if not, there is no clearing function needed unless a bundle is "in transit" when a lower level is selected, this condition having already been discussed.

Finally, about the only other thing that remains to be covered is how the system works when set to discharge at the bottom level which means, of course, that the bundle goes on through on conveyor 12. It has already been explained that the bundle-stop 40 is retracted beneath the surface of conveyor 12 in this mode; therefore, it cannot be struck by an incoming bundle to actuate switch 350 and start the elevating cycle. The elevator is stopped because one of the flights or other switch actuating means is holding switch 362 actuated. With relay 338 deenergized, the brake is set and the clutch is disconnected so that the whole elevating system is at a standstill except for the conveyor drive mechanism 324 and the elevator drive mechanism 192 which is running even though disconnected from the elevator chains. The only exception to this is such movement as may be taking place to clear the system of bundles previously programmed to one of the higher levels.

Having thus described the several useful and novel features of our bundle elevator, it should be apparent that the many worthwhile objectives for which it was developed have been realized. While but a single specific embodiment of the invention has been illustrated and described herein, we realize that certain changes and modifications will occur to those skilled in the art within the broad teaching hereof; hence, it is our intention that the scope of protection afforded hereby shall be limited only insofar as said limitations are expressly set forth in the appended claims.

What we claim is:

1. An elevator for bundled newspapers or the like which comprises: a vertically disposed rigid frame open at the front and with a hollow interior defining an elevator shaft; vertically spaced parallel shafts journaled for rotation in the top and bottom of the frame extending transversely thereof; a pair of sprockets mounted on each shaft for rotation therewith in transversely spaced relation to one another and in vertically aligned relation to the pair on the other of said shafts; an endless sprocket chain reaved between each vertically aligned pair of sprockets; at least two flight subassemblies attached to the sprocket chains at spaced intervals throughout the length thereof, each of said subassemblies including at least one trunnion block attached alongside horizontally aligned chain links on both chains, each of said trunnion blocks having vertically spaced and aligned trunnions journaled for rotation about parallel horizontally disposed axes projecting laterally therefrom on the side remote from the chain, and a thin elongate pickup arm projecting forward horizontally from each trunnion block in transversely spaced parallel relation to one another; channel-shaped tracks opening toward the chains in spaced parallel relation to the straight runs thereof located on each side carrying a trunnion block, said tracks being positioned to guide the flight subassemblies and adapted to maintain their pickup arms essentially horizontal under load; drive means operatively connected to one of the shafts; a first roller conveyor extending transversely across the front of the frame near the lower end thereof, said conveyor including at least two pairs of adjacent spaced parallel rollers independently journaled at their rear ends so as to provide a gap positioned and adapted to pass the arms of the flight subassemblies therebetween; a second conveyor located at a higher level than said first conveyor extending transversely across the front of the elevator in spaced relation thereto at a distance such that the pickup arms pass therebetween; and, a first bundle transfer subassembly located at the level of said second conveyor between the pickup arms of the flight subassemblies, said transfer subassembly including a horizontally extendable pusher movable in a direction normal to the direction of conveyor movement, and said pusher being operative upon actuation with one of said flight subassemblies at the level of said second conveyor to effect the transfer of a bundle therebetween.

2. The bundle elevator as set forth in claim 1 in which: the drive means is operative upon actuation to move the flight subassemblies in a direction to lift bundles from the first conveyor and deliver same to said second conveyor; and, the first bundle transfer subassembly is housed inside the elevator shaft with the pusher located between the sprocket chains facing forwardly, said pusher being operative upon actuation to extend and push a bundle from the adjacent flight subassembly immediately therebeneath off onto the second conveyor alongside thereof.

3. The bundle elevator as set forth in claim 1 in which: the pusher subassembly includes a solenoid-valve controlled servomotor connected to the pusher and operative upon actuation to extend same, a forward limit switch responsive to extension of said pusher to deenergize said servomotor controlling same, and a rear limit switch responsive to movement of the pusher and operative to deenergize the drive means when said pusher is extended.

4. The bundle elevator as set forth in claim 1 in which: each of the flight subassemblies includes a pair of trunnion blocks mounted on opposite sides of the same chain link, a connecting member bridges the gap left between said pair of trunnion blocks across the face of the link, and said pickup arms each include a pair of tines projecting from said connecting member in spaced substantially parallel relation to one another, said tines of each of said arms being spaced apart a distance adapted to pass a roller of the first conveyor therebetween; the tracks comprise a pair of channel-shaped members opening toward one another positioned to receive the trunnions carried by the trunnion blocks on both sides of each chain; and, the first roller conveyor includes two rollers independently journaled at their rear ends and with gaps on both sides thereof adapted to pass the tines of the bifurcated pickup arms.

5. The bundle elevator as set forth in claim 1 in which: the second conveyor and first bundle transfer subassembly are located intermediate the top and bottom of the elevator; a third conveyor is arranged in spaced parallel relation above the second conveyor extending transversely across the elevator slightly beneath the top thereof; and, a second bundle transfer subassembly is located at the top of the elevator, said second transfer subassembly being operative upon actuation to effect the transfer of a bundle between said third conveyor and a flight subassembly horizontally aligned with the latter.

6. The bundle elevator as set forth in claim 2 in which: a retractable bundle-stop subassembly is located beneath the first roller conveyor operative upon actuation to obstruct the path of a bundle moving thereacross and stop same in front of the elevator in position to be lifted by the flight subassemblies thereof, said subassembly including a plate mounted and guided for upward movement between a pair of adjacent spaced parallel rollers of the conveyor, and servomotor means connected to said plate operative upon actuation to raise same from a retracted position beneath the load-carrying surface of said conveyor to an elevated position projecting thereabove.

7. The bundle elevator as set forth in claim 2 in which: a generally U-shaped bail is attached to the elevator frame for hinged movement about a transversely extending horizontal axis interconnecting the free ends thereof, said bail projecting out over the rising flights in position to closely encircle an unbroken properly aligned bundle supported thereon, and means responsive to lifting movement of the bail operatively connected to the drive means and adapted upon actuation to deenergize the latter.

8. The bundle elevator as set forth in claim 2 in which: a bundle-straightening subassembly is mounted alongside the first roller conveyor across from the elevator and in opposing relation thereto, said subassembly including an extendable pusher movable horizontally toward the elevator across the top of the first roller conveyor, said pusher being operative upon actuation to push a bundle located in front thereof atop the roller conveyor up snug against the elevator.

9. The bundle elevator as set forth in claim 2 in which: means comprising a safety gate is mounted at the top of the elevator for hinged movement about a transverse axis, said gate including a member extending transversely across said elevator in position to be lifted by a rising bundle about to go over the top thereof while clearing the flight subassemblies as they turn therebeneath, and means responsive to lifting of said gate member operative upon actuation to deenergize said drive means.

10. The bundle elevator as set forth in claim 2 in which: the drive means includes an electric motor, electrically actuated clutch means interposed between said motor and elevator drive shaft operative upon energization to form driving connection therebetween, and an electrically actuated brake means connected to one of said elevator shafts operative upon energization to release same for rotation.

11. The bundle elevator as set forth in claim 6 in which: a bundle-straightening subassembly is mounted alongside the first roller conveyor across from the elevator and in opposing relation thereto, said subassembly including an extendable pusher movable horizontally toward the elevator across the top of the first roller conveyor, said pusher being operative upon actuation to push a bundle located in front thereof atop the roller conveyor up snug against the elevator.

12. The bundle elevator as set forth in claim 6 in which: the drive means includes an electric motor, electrically actuated clutch means interposed between said motor and elevator drive shaft operative upon energization to form driving connection therebetween, and an electrically actuated brake means connected to one of said elevator shafts operative upon energization to release same for rotation.

13. The bundle elevator as set forth in claim 6 in which: pattern selector means having at least two positions is connected to the bundle-stop subassembly, said means being operative in one position to deactuate the servomotor means of said bundle-stop subassembly and in all other positions to actuate same.

14. The bundle elevator as set forth in claim 8 in which: the straightener subassembly includes a solenoid-valve controlled servomotor connected to the pusher operative upon energization to extend same, and a forward limit switch responsive to movement of the pusher into extended position so as to deenergize said solenoid and retract said pusher to its original position.

15. The bundle elevator as set forth in claim 11 in which: switch means responsive to movement of an incoming bundle against the bundle-stop subassembly with the latter elevated into operative position is connected to the bundle-straightening subassembly and becomes operative to actuate the latter upon actuation.

16. The bundle elevator as set forth in claim 12 in which: a control circuit having cycle initiating means and flight subassembly indexing means is connected to the drive means and is automatically operative to raise an incoming bundle from the first roller conveyor to the level of the second conveyor means in position to be discharged thereon, said cycle initiating means being responsive to a bundle striking the bundle-stop subassembly when the latter is actuated into operative position so as to engage the clutch and disengage the brake of the drive means, and said flight subassembly indexing means being operatively associated with the flight subassemblies and responsive to the arrival thereof at the discharge position opposite the second conveyor means to disengage the clutch and set the brake of the drive means.

17. The bundle elevator as set forth in claim 16 in which: the pusher subassembly includes a solenoid controlled servomotor connected to the pusher operative upon actuation to extend same, and a forward limit switch responsive to extension of the pusher operative upon actuation to deenergize said servomotor controlling same; and, the flight subassembly indexing means of the control circuit is connected to the solenoid-controlled servomotor of the pusher subassembly and operative upon arrival of a flight subassembly at the second conveyor means to actuate same.

18. The bundle elevator as set forth in claim 16 in which: a third conveyor means is located in vertically spaced relation above the second conveyor means so as to extend transversely across in front of the elevator at a level aligned horizontally with one of the stopping points of the flight subassemblies; a second bundle transfer subassembly is housed within the elevator facing outwardly between the chains, said subassembly including a pusher operative upon actuation to transfer a bundle resting atop a flight subassembly aligned therewith off onto the third conveyor means; and, a pattern selector means having at least three operative positions is connected to the bundle-stop subassembly and both bundle transfer subassemblies, said pattern selector means being operative in first position to deactuate the bundle-stop subassembly so as to allow a bundle to pass straight through on the first roller conveyor, in a second position to actuate the bundle-stop subassembly and the first bundle transfer subassembly, and in a third position to actuate the bundle-stop subassembly and the second bundle transfer subassembly while deactuating the first bundle transfer subassembly.

19. The bundle elevator as set forth in claim 18 in which: the pattern selector means is connected to the bundle-straightener subassembly and operative in first position to deactuate same while actuating said subassembly in all other positions.